(12) United States Patent
Kuramoto et al.

(10) Patent No.: US 7,181,121 B2
(45) Date of Patent: Feb. 20, 2007

(54) OPTICAL DEVICE AND METHOD FOR MANUFACTURING THE SAME

(75) Inventors: Keiichi Kuramoto, Kadoma (JP); Youhei Nakagawa, Hirakata (JP); Mitsuaki Matsumoto, Osaka (JP); Hiroaki Izu, Hirakata (JP); Hitoshi Hirano, Nishinomiya (JP); Nobuhiko Hayashi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/850,463

(22) Filed: May 21, 2004

(65) Prior Publication Data

US 2005/0008317 A1    Jan. 13, 2005

(30) Foreign Application Priority Data

May 23, 2003 (JP) ............................ 2003-146107
May 13, 2004 (JP) ............................ 2004-144185

(51) Int. Cl.
*G02B 6/10* (2006.01)

(52) U.S. Cl. .................. 385/132; 385/129; 385/130

(58) Field of Classification Search .............. 385/129, 385/130, 132

See application file for complete search history.

(56) References Cited

U.S. PATENT DOCUMENTS 5,872,883 A    2/1999  Ohba et al
5,949,934 A *  9/1999  Shima et al. ............... 385/37
2003/0061836 A1  4/2003  Higuchi et al.

FOREIGN PATENT DOCUMENTS

| JP | 2-131202 | 5/1990 |
| JP | 23-131202 | 5/1990 |
| JP | 9-145943 | 6/1997 |
| JP | 2001-235646 A | 8/2001 |
| JP | 2002-350661 A | 10/2002 |
| JP | 2003-172841 A | 6/2003 |

OTHER PUBLICATIONS

Japanese Office Action issued in corresponding Japanese Patent Application No. JP 2004-144185, dated Aug. 22, 2006.

T. Takahashi et al. "Fabrication of Replicated Polymer Optical Waveguides", Technical Report of the Institute of Electronics, Information and Communication Engineers, Oct. 4, 2002, 29-33, vol. 102, No. 369.

* cited by examiner

*Primary Examiner*—Jennifer Doan
(74) *Attorney, Agent, or Firm*—McDermott Will & Emery LLP

(57) ABSTRACT

An optical device includes a substrate, a core provided on the substrate, a first clad and a second clad formed around the core. The optical device further includes a light absorber layer, provided on the substrate, which absorbs light leaked from the core. The light absorber layer is formed of, for instance, the same material as that constituting the core.

15 Claims, 15 Drawing Sheets

RELATED ART

POSITION →

OPTICAL DEVICE AND METHOD FOR MANUFACTURING THE SAME

The priority Japanese Patent Application No. 2003-146107 upon which this patent application is based is hereby incorporated by reference.

BACKGROUND OF THE INVENTION

1. Field of the Invention

The present invention relates to optical devices and a method for manufacturing the optical devices.

2. Description of the Related Art

Along with advances in information communication networking in recent years, technologies for transmitting signals through the medium of light are being developed to realize higher-speed transmission of signals. One of the well-known technologies for signal transmission by light is a variety of optical transmission systems using optical waveguides as transmission lines.

For example, patent-related Reference (1) in the following Related Art List discloses a technology whereby an organic polymer material, which will form a core, is filled in a pattern by using a stamper (forming die) where the pattern corresponding to an optical waveguide is provided in the recessed shape, and then the organic polymer material is hardened under the influence of external energy such that the optical waveguide is formed projecting from a substrate surface. FIGS. 1A to 1C illustrate a manufacturing process of an optical waveguide using a stamper. As illustrated in FIG. 1A, a lower clad 112 is formed on a substrate 120 and then core solution 114a, which will constitute a core, is applied thereon. Then, as illustrated in FIG. 1B, a stamper 122 formed with a groove or recess which corresponds in form to an optical waveguide, is pressed against the core solution 114a, and in this condition, the core solution 114a is hardened by irradiating it with ultraviolet rays. In this manner, a core 114 is formed as illustrated in FIG. 1C.

Patent-related Reference (2) in the following Related Art List discloses a technology whereby an optical waveguide at a bent portion thereof, which connects in a curve two points whose optical axes of incoming and outgoing light are not aligned with each other, is divided into a plurality of narrow optical waveguides by clad portions provided inside the core at the bent portion. This structure can reduce optical loss, which may otherwise result from light leakage from the optical waveguide at the bent portion.

3. Related Art List (1) Japanese Patent Application Laid-Open No. Hei02-131202.
(2) Japanese Patent Application Laid-Open No. Hei09-145943.

However, according to the method described in the above patent-related Reference (1), core solution 114a is left over between a lower clad 112 and a stamper 122 when the stamper 122 is pressed against the core solution 114a, as shown in FIG. 1B. And if the core solution 114a is hardened in such a condition, a residual core layer will be formed on the lower clad 112 as shown in FIG. 1C. Furthermore, if the residual core layer is thick, some of light, as it travels through the core 114, will leak therefrom into the residual core layer, thus causing an optical loss. And if the optical loss is large, then the function of the optical waveguide will degrade.

An optical waveguide may be so designed that the core is bent or branched so as to propagate or branch light in a desired direction or directions. In such a case, however, light may leak from the core into the clad at a curved or branched point. And the leak of light into the clad creates a problem of increased optical loss. Moreover, the light leaking into the clad may enter a light receiving element, thus causing a drop in communication quality. Further, the light that has leaked into the clad may return to the core to produce interference with optical signals coming through the core, thereby creating a problem of added noise.

The technology introduced in the above patent-related Reference (2) has an objective of reducing such leakage of light from the core. However, the structure achieved by the method disclosed in Reference (2) is such that the core is branched into a plurality of cores at the bend and the branched cores are again joined into a single core. At the meeting point, therefore, lights having passed through different optical path lengths are brought together, which may produce interference and other problems.

SUMMARY OF THE INVENTION

The present invention has been made in view of the foregoing circumstances and an object thereof is to provide an optical device that can not only reduce the leakage of propagated light from a core but also reduce the amount of noise and a method of production thereof.

According to the present invention, there is provided an optical device having a core and a clad formed around the core, the clad including: a first clad having a recess in a flat area; and a second clad formed on the first clad, and the core being formed so as to fill in the recess of the first clad and being structured such that, in a cross section substantially perpendicular to a light propagation direction, narrowed portions are narrowly formed near the flat area of the first clad. The optical device may be formed on a substrate such as glass. Moreover, the core may be formed in a curved shape such that a top surface thereof is dented below the height of the flat area in the first clad. Here, the narrowed portion is an area where the thickness of a residual core layer or a core is reduced in the vicinity of the boundary between the residual core layer on a flat area of the clad and the core.

By implementing the above structures, the leakage of light from the core is suppressed, so that the optical loss otherwise caused thereby can be reduced. Furthermore, the light is not leaked into the residual core layer from the core even if a residual core is present between the flat area of the first clad and the second clad. Thus, the optical loss can be reduced.

The optical device according to the present invention may further include a light absorbing area, provided on the same plane as the core, which absorbs light leaked from the core.

Here, the light absorbing area is an area which can absorb the leaked light so that the light leaked into the clad from the core does not return to the core again. The light absorbing area may be made of any material which can absorb such leaked light. The light absorbing area may be formed of material, for example, whose refractive index is higher than that of material constituting the clad. Moreover, the light absorbing area may be formed of the same material as that constituting the core. Moreover, the light absorbing area may be formed of material where an oxide such as silica ($SiO_2$) or a suspended matter such as carbon powder is added and suspended with the material constituting the clad.

By implementing the above structures and material, noise generated and caused in a case when the light leaked into the clad returns to the core again or enters into a light receiving element can be suppressed.

Moreover, the light absorbing area may be formed separately from the core. Here, "separately" means that the light absorbing area may be formed separately from the core to a degree that the optical loss of the light propagated through the core can be ignored. If there is a residual core layer between the core and the light absorbing area, the thickness of the residual core layer may be 4 µm or below, or more preferably, 2 µm or below. It is to be noted that the core may be structured in such a manner that it is separated from the residual core layer. By implementing such a structure, the light will not be leaked into the residual core layer from the core, thus reducing the optical loss.

In an optical device according to the present invention, the light absorbing area may be provided at both sides of a core along the light propagation direction in the core. By implementing such a structure, the light once leaked from the core can be effectively prevented from returning to the core again.

In an optical device according to the present invention, the clad may include a first clad formed on an entire surface of the substrate and a second clad formed on the first clad. A core may be formed on the first clad, and the second clad, formed on the first clad, may be formed around the core. A light absorbing area, formed on the first clad, may be formed over an entire surface of the substrate other than an area in which the core and the second clad are provided. By such a structure, the light leaked from the core can be absorbed effectively by the light absorbing area. Thus, the interference of light to be caused when the light leaked from the core returns thereto can be reduced.

In an optical device according to the present invention, the core may have a bent portion and/or branched portions relative to an axis of incident light, and the light absorbing area may be provided in the vicinity of the bent portion and/or branched portions. In such a bent portion or branched portions, the problem that the light is leaked from the clad to the core is most likely to occur. By implementing the structure such that the light absorbing area is provided in the vicinity of the bent portion or branched portions, the light leaked from the core can be effectively absorbed in the bent portion or branched portions. Thus, the interference of light to be caused when the light leaked from the core returns thereto can be reduced. The light absorbing area may be provided on an axis approximately identical to an axis of incident light. Thus, the light leaked from the bent portion or branched portions can be efficiently absorbed.

In an optical device according to the present invention, one of the light absorbing area and the clad may be formed of material containing a carbonyl group, and the other thereof may be formed of material containing a hydroxyl group. Thereby, hydrogen bonds are formed between the light absorbing area and the clad, and the adhesion therebetween can be improved.

According to the present invention there is provided a method for manufacturing an optical device, the method including: filling, by applying core solution on a clad where a first recess is formed on a flat area of a surface thereof, the first recess with the core solution; removing the core solution applied on the surface of the clad by pressing a forming die against the clad; and forming a core, having narrowed portions formed narrowly in the vicinity of the flat area, in the first recess by hardening the core solution in a state where the forming die is being pressed against the clad. With this method, the light is not leaked into a residual core layer from the core even if the residual core layer is present in the flat area of the clad. Thus, the optical loss can be reduced and, moreover, the optical devices can be manufactured without difficulty. This method may further include forming a second clad by applying clad solution on at least the core and hardening the clad solution. Moreover, the core may be formed of material whose refractive index is higher than that of air, so that the optical device can be made to function with the air serving as the clad and without ever forming the clad. After completing the production of the optical device, the substrate may be removed.

In the above-described method for manufacturing an optical device, the clad may further include a second recess, the filling the first recess with the core solution may further include filling the second recess with the core solution, and the forming core may further include forming a light absorbing area in the second recess. By implementing the structure realized by this method, the light absorbing area which can effectively absorb the light leaked from the core can be easily formed, so that noise generated and caused in a case when the light leaked into the clad returns to the core again or enters into a light receiving element can be suppressed.

It is to be noted here that the first clad is not limited to the one formed integrally by the same material and that the first clad may be formed by a plurality of materials as long as such materials have a capability of confining the light within the core. In the first clad, a second recess may be so structured as to be open at both sides thereof. This structure allows the core solution present at the contact area between the first clad and a flat plate to escape from the second recess when the flat plate is pressed against the first clad, thus preventing a residual core layer from being formed on the surface of the first clad.

According to the present invention, there is provided another method for manufacturing an optical device, the method including: applying core solution on a surface of a clad; removing the core solution applied on a flat area by pressing a forming against the clad, the forming die being such that a first recess is formed in the flat area of a surface thereof and a pair of projections is formed in the vicinity of both sides of the first recess; and forming a core, having narrowed portions formed in the vicinity of the projections, in the first recess by hardening the core solution in a state where the forming die is being pressed against the clad. In the method for manufacturing an optical device according to the present invention, the forming die may further include a second recess and the forming core may further include forming a light absorbing area in the second recess. This method may further include applying clad solution on at least the core and forming a second clad by hardening the clad solution. Moreover, by constituting the core by a material whose refractive index is higher than that of air, an optical device where the air functions as a clad can be provided without forming the second clad.

In a method for manufacturing an optical device according to the present invention, a forming die may be formed of an elastic material whose durometer hardness A is 85 or below. The use of such a material makes it possible for the shape of core or light absorbing area to be changed as appropriate. Thus, even if there is small unevenness in the contact surface between the first clad and the forming die, the forming die changes its form according to the unevenness. As a result, the forming die can be closely adhered to the first clad, and the core solution present in the contact area between the first clad and the forming die can be efficiently ejected outside. Moreover, the use of such a material also makes it possible to form the above-described narrowed portions on the core or the core and light absorbing area. The narrowed portions can also be formed by appropriately adjusting a pressure at which the forming die is pressed against the first clad.

Still another manufacturing method according to the present invention may include: applying first clad solution on a substrate; pressing a forming die having a molding surface with a first projection against the first clad solution; and forming a first clad provided with a first recess to which the molding surface is transcribed, by hardening the first clad solution in a state where the forming die is being pressed against the first clad solution. Moreover, still another manufacturing method according to the present invention may include: applying first clad solution on a substrate; pressing a forming die having a molding surface with a first projection and a second projection against the first clad solution; and forming a first clad provided with a first recess and a second recess to which the molding surface are transcribed, by hardening the first clad solution in a state where the forming die is being pressed against the first clad solution. Here, the forming die may be formed of an elastic material whose durometer hardness is 85 or below.

The core solution and clad solution may be hardened by irradiating them with light such as ultraviolet rays, for example. They may also be heat-cured, or the light curing may be used together with the heat curing.

The above-described optical devices may be applied to and utilized in optical beam splitters, optical transceiver modules and so forth.

In the present invention the core, the clad and the light absorbing area may be formed of an organic material or an organic-inorganic composite material.

The organic-inorganic composite material may contain at leas one type of metal alkoxide. The organic-inorganic composite material may further contain an organic polymer.

The metal alkoxide usable in this invention is generally what is expressed by $M(OR)_n$ (M: a metal, R: an alkyl group, n: 2, 3, 4 or 5), $R'M(OR)_{n-1}$ (M: a metal, R: an alkyl group, R': an organic group, n: 2, 3, 4 or 5), or $R'_2M(OR)_{n-2}$ (M: a metal, R: an alkyl group, R': an organic group, n: 2, 3, 4 or 5). The metal alkoxide may also contain organoalkoxysilane and what is called a silane coupling agent.

Si, Ti, Zr, Al, Sn, Zn or the like are preferably used as the metal (M). For example, when the metal (M) is a tetravalent metal, a metal alkoxide expressed as $M(OR)_4$, $R'M(OR)_3$ or $R'_2M(OR)_2$ may be used.

An alkyl group whose carbon number is 1 to 5 may be used as the alkyl group (R).

The organic group (R') which usable herein is, for instance, an alkyl group, an aryl-containing group, an acryloxy-containing group, an methacryloxy-containing group, a styryl-containing group, an epoxy-containing group or the like.

The metal alkoxide to be used preferably is alkoxysilane, titanium alkoxide or zirconium alkoxide or niobium alkoxide, of which alkoxysilane is used most preferably.

The alkoxysilane usable herein includes tetraethoxysilane, tetramethoxysilane, tetra-n-propoxysilane, tetraisopropoxysilane, tetra-n-butoxysilane, tetraisobutoxysilane, phenyltriethoxysilane, phenyltrimethoxysilane, diphenyldiethoxysilane, diphenyldimethoxysilane, 3-methacryloxypropyltriethoxysilane, 3-methacryloxypropyltrimethoxysilane, 3-methacryloxypropylmethyldimethoxysilane, 3-acryloxypropyltrimethoxysilane, or the like.

The titanium alkoxide usable may be titanium isopropoxide, titanium butoxide or the like.

The zirconium alkoxide usable may be zirconium isopropoxide, zirconium butoxide or the like. The niobium alkoxide useable may be pentaethoxyniobium or the like.

As the organic polymer, any organic polymer can be used so long as it, together with a metal alkoxide, can form an organic-inorganic composite material. Such an organic polymer, for instance, may be a high polymer having a carbonyl group, a high polymer having a benzene ring or a high polymer having a naphthalene ring. Concrete examples of the organic polymer may include polyvinyl pyrrolidone, polycarbonate, polymethylmethacrylate, polyamide, polyimide, polystyrene, polyethylene, polypropylene, epoxy resin, phenol resin, acrylic resin, urea resin and melamine resin. In order to form an organic-inorganic composite material which excels in optical transparency, however, polyvinyl pyrrolidone, polycarbonate, polymethylmethacrylate, polystyrene or their mixture is preferably used as the organic polymer.

In addition, a hydrolytic polycondensate of 3-methacryloxypropyltriethoxysilane, a hydrolytic polycondensate of 3-methacryloxypropyltrimethoxysilane, a hydrolytic polycondensate of p-styryltriethoxysilane, a hydrolytic polycondensate of diphenyldimethoxysilane, or a hydrolytic polycondensate of diphenyldiethoxysilane and a hydrolytic polycondensate of p-styriltrimethoxysilane is also preferably used as the organic polymer. When the above-mentioned organic-inorganic composite material is to be prepared by the sol-gel method using an organic polymer as cited above, alcohol, such as methanol, ethanol, isopropanol or butanol, may be used as the solvent.

On the other hand, when a resin, such as polymethylmethacrylate, polystyrene or polyvinyl naphthalene, is used as the organic polymer, a solvent, such as N-methyl-2-pyrroridone or dimethyl formamide, may be used. Moreover, in order to reduce the light propagation loss an additive agent may be added at the time of synthesizing the materials. More specifically, any of a variety of organic acid anhydrides, such as trifluoroacetic acid, which remove the water content by reacting with the water content in the material may be added. Moreover, a metal alkoxide, such as trimethylethoxysilane or trimethylmethoxysilane, which can have a polycondendsation with a silanol group generated during the synthesizing of materials and which has a hydrolyzable group may be added Further, the core may be formed of any of a variety of UV-cured resins. Such a UV-cured resin to be used here is, for instance, an epoxy UV-cured resin whose principal component is epoxy resin, an acrylic UV-cured resin, an epoxy acrylate UV-cured resin or a polyurethane UV-cured resin.

The elastic material may be made of a polysiloxane type. Such a material to be used is silicone rubber, for instance. As a result, the shape is further easily deformable and the detachability or fissility is improved.

It is to be noted herein that any arbitrary combination of the above-described structural components and expressions changed between a method, an apparatus, a system, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on generic and preferred embodiments which do not intend to limit the scope of the present invention but exemplify the invention. All of the features and the combinations thereof described in the embodiment are not necessarily essential to the invention.

Generic Embodiments

The optical device according to the present invention may preferably be used for optical propagation path structures, such as optical waveguides or optical fibers, and optical communication devices using such structures, which may include optical beam splitters, optical transceiver modules, optical couplers, optical connectors, optical switches, variable optical attenuators (VOA), optical circulators, optical isolators, optical modulators, optical amplifiers, wavelength filters, multi/demultiplexers, wavelength splitters, interleavers, and dispersion compensators. Furthermore, the optical device according to the present invention may be put to use with or applied to electrical wiring boards, machine parts material, reflection preventing films, surface protection film and various other coating materials, eyeglasses, optical lenses (aspherical lenses included), optical filters including those for DWDM (Dense Wavelength Division Multiplexing), diffraction gratings, light guiding plates, interferometers, optical couplers, optical multi/demultiplexers, optical sensors, hologram optical elements, other optical parts material, photovoltaic elements, contact lenses, artificial tissues for medical use and so forth.

Figure 2A:
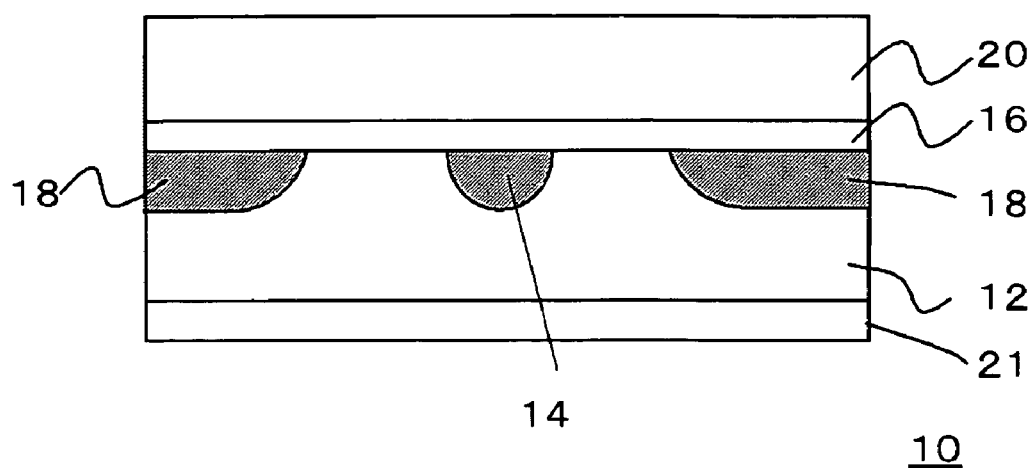
FIGS. 2A and 2B are each a cross-sectional view of a structure of an optical device according to an embodiment of the present invention.
Figure 2B:
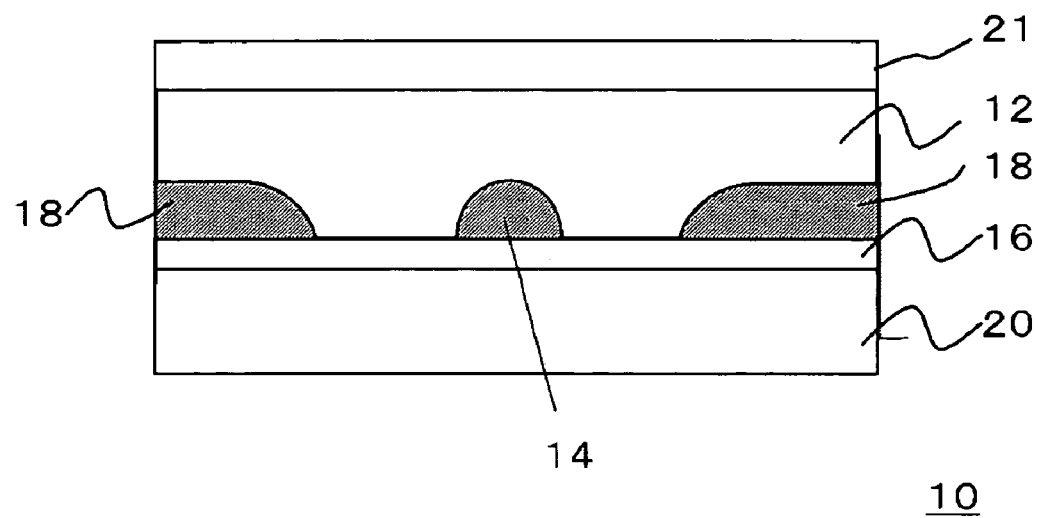

FIGS. 2A and 2B are each a cross-sectional view of a structure of an optical device to according to an embodiment of the present invention.

The optical device 10 includes a first clad 12, a core 14, a second clad 16, a light absorber layer 18, a substrate 20 and a substrate 21.

The substrate 20 and the substrate 21 are formed, for instance, of glass, silicon, ceramics, organic-inorganic composite material or resin. It is to be noted that the substrates 20 and 21 are not always necessary and they can even be removed after the fabrication of the optical device.

The first clad 12, the second clad 16 and the light absorber layer 18 may be formed of an organic material or an organic-inorganic composite material as mentioned above. The organic-inorganic composite material may contain a metal alkoxide and an organic polymer. In such an organic-inorganic composite material, the refractive index thereof may be suitably set by adjusting, as appropriate, the mixing ratio of the metal alkoxide and the organic polymer. Use of an organic-inorganic composite material for the first clad 12, the second clad 16 and the light absorber layer 18 results in the inclusion of a carbonyl group or a hydroxyl group of a metal alkoxide in each of the layers. And this contributes to the formation of hydrogen bonds at the interface between the layers, so that the adhesion therebetween can also be improved. In FIG. 2A and FIG. 2B, the first clad 12, the second clad 16, the core 14 and the light absorber layer 18 are so configured as to be on the substrate 20 or the substrate 21, but the substrate 20 or the substrate 21 may be removed after the formation of these layers. Thereby, the optical device 10 may be constituted with a degree of flexibility. An optical device provided with this kind of flexibility may be desirably used as optical wiring material such as one for connecting optical boards.

Figure 3A:
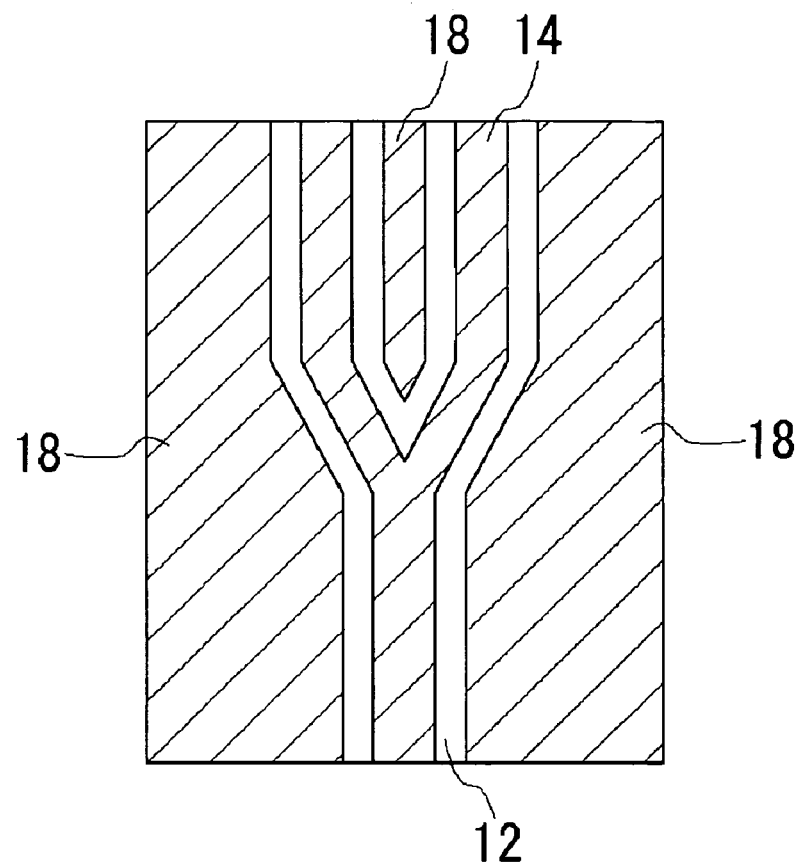
FIGS. 3A and 3B are each a top view showing a structure of a first clad, a core and a light absorber layer.
Figure 3B:
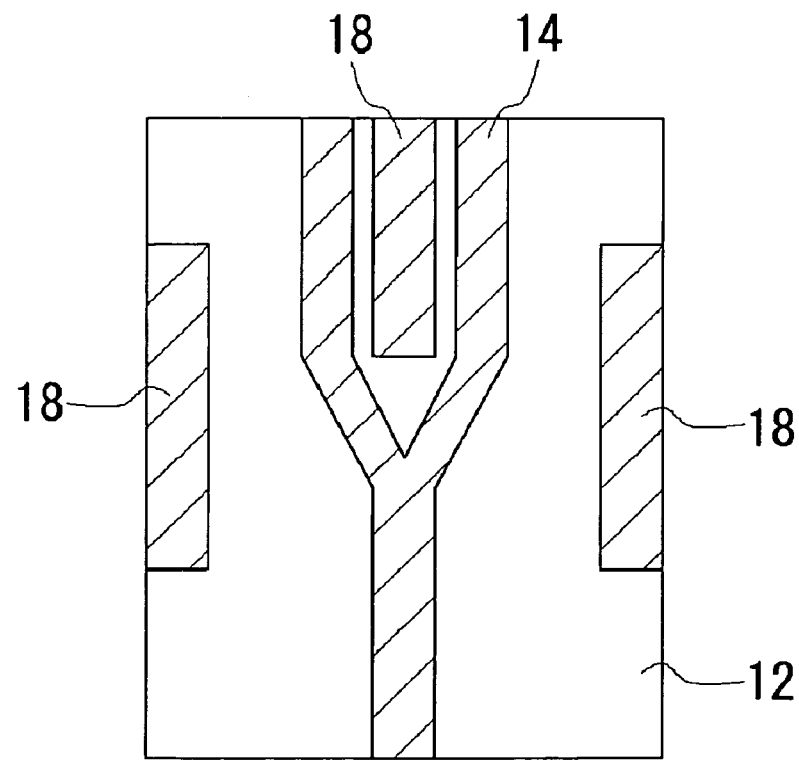

FIGS. 3A and 3B are each a top view showing a structure of a first clad 12, a core 14 and a light absorber layer 18. Here a description is given of a case where the core 14 is structured in a Y-shaped branch form. The first clad 12 is formed around the core 14.

As shown in FIG. 3A, the light absorber layer 18 is formed over the first clad 12 in such a way as to cover the entire area other than the first clad 12 formed around the core 14. This structure can make it possible for the light absorber layer to effectively absorb light leaked from the core 14 and thus can reduce the interference of light to be caused when the light leaked from the core 14 returns thereto after propagating through the first clad 12. As a result, noise can be reduced.

As illustrated in FIG. 3B, the light absorber layer 18 may be formed in stripes in the vicinity of the core 14. This arrangement makes it possible for the light absorber layer 18 to absorb light leaked from the core 14 and thus reduces the interference of light by the leaked light returning to the core 14. Now if the core 14 has a bent portion relative to the axis of incident light, then it is preferable that the light absorber layer 18 be provided substantially on the same axis as the axis of incident light. By this arrangement, the light absorber layer 18 can absorb light leaked from the bent portion, thus effectively reducing the interference due to the thus leaked light. Moreover, a plurality of light absorber layers 18 formed in stripes as shown in FIG. 3B will broaden the area of interface between the light absorber layer 18 and the first clad 12, so that light leaking from the core 14 may be scattered to further reduce the interference of light by the returning light.

FIGS. 4A to 4G illustrate processes showing a production procedure for an optical device 10 shown in FIG. 2A.

Figure 4A:
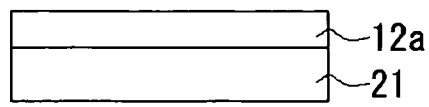
FIGS. 4A to 4G are process drawings showing a fabrication procedure for an optical device shown in FIG. 2A.
Figure 4B:
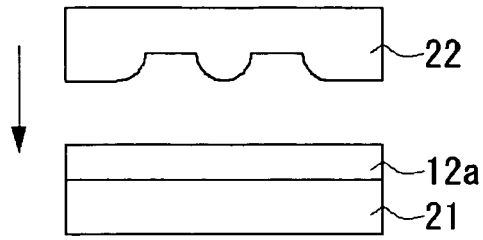

First a clad solution layer 12a is formed on a substrate 21 by dripping clad solution, which will form a first clad on the substrate 21 (FIG. 4A). Then a projecting stamper (forming die) 22 is positioned above the clad solution layer 12a (FIG. 4B).

Referring to FIGS. 5A to 5D, a method for producing a projecting stamper 22 is described below.

Figure 5A:
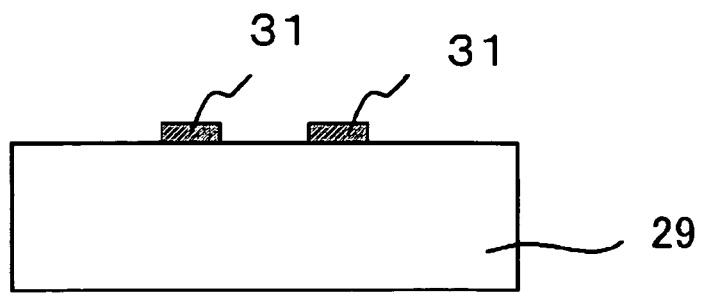
FIGS. 5A to 5D are process drawings showing a production procedure of a projecting stamper.
Figure 5B:
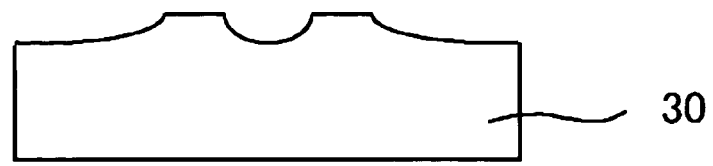

First, a glass mold 30 with projections (convexes) and recesses (concaves) identical to those on an intended first clad 12 is produced. The glass mold 30 can be formed by photolithography for instance. A flat glass substrate 29 is prepared, and a film of Cr or the like, which will serve as mask material, is formed on the flat glass substrate 29. Then a resist (not shown) is formed on the Cr film into a pattern having a predetermined shape. Then a mask 31 is formed by etching the Cr film into a predetermined form, with the resist used as the mask (FIG. 5A). Following this, the projections and recesses of predetermined shapes are formed on the surface of the flat glass substrate 29 by wet etching performed using hydrogen fluoride as etchant on the area other than the area of the mask 31 formed on the flat glass substrate 29. After this, the glass mold is produced by removing the resist and the mask 31 (FIG. 5B).

Figure 5C:
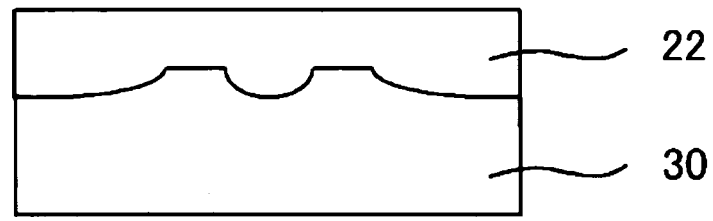
Figure 5D:
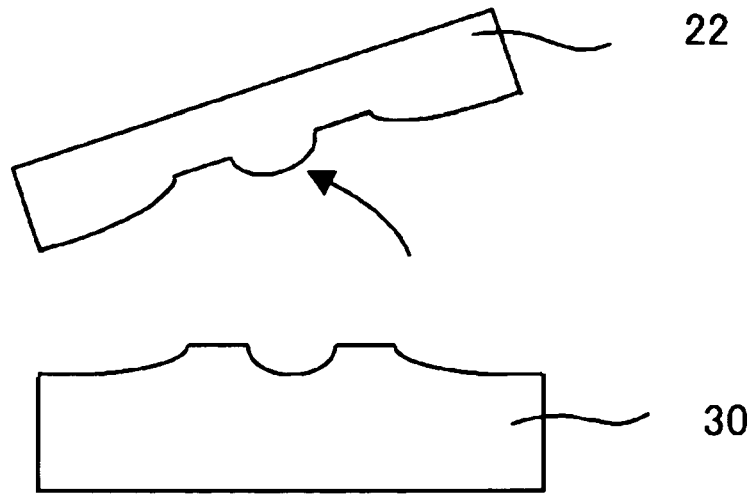

As a projecting stamper 22 may be produced by first pouring a liquid, which can be hardened into an elastic material, into the thus produced glass mold 30 and then hardening it (FIG. 5C). Then the projecting stamper 22 is separated from the glass mold 30 (FIG. 5D).

The projecting stamper 22 may be formed of an elastic material whose durometer hardness A is 85 or below. Use of such an elastic material improves the detachability of the projecting stamper 22. When forming a first clad 12 with the projecting stamper 22, therefore, the stamper can be detached easily from the first clad 12. The shape of the first clad 12 may be appropriately changed by adjusting the pressure to be applied to the projecting stamper 22. More preferably, the projecting stamper 22 may be formed of an elastic material whose durometer hardness A is 56 or below. The measuring method of durometer hardness A is to comply with JIS K6253-5 (Durometer Hardness Testing). Silicone rubber is an example of such material.

Referring back to FIGS. 4A to 4G, a first clad 12 is formed by pressing a projecting stamper 22, produced as described above, against a clad solution layer 12a and then hardening the clad solution layer 12a by irradiating it with ultraviolet rays (FIG. 4C). If silicone rubber as mentioned above is used as the projecting stamper 22, the silicone rubber will change its form according to the contraction that occurs with the hardening of the clad solution layer 12a, thus preventing cracking or peeling. Formed at this point in the first clad 12 are a recess 13a in round or other form, where a core 14 will be formed later, and pockets 13b, where light absorber layers 18 will be formed later. Thereafter, the projecting stamper 22 is removed and a core solution layer 14a is formed by dripping core solution on the first clad 12 (FIG. 4D). Then a flat plate 23 is positioned above the first clad 12 and the core solution layer 14a, and the flat plate 23 is pressed against the first clad 12 to remove unnecessary core solution from the contact area between the first clad 12 and the flat plate 23. In this condition, a core 14 and light absorber layers 18 are formed by hardening the core solution layer 14a through irradiation of ultraviolet rays (FIG. 4E). Here, the flat plate 23 may be formed of an elastic material whose durometer hardness A is 85 or below, or more preferably 56 or below. Again, silicone rubber is an example of such material. Silicone rubber, used as the flat plate 23, will change its form according to the contraction that occurs with the hardening of the core solution layer 14a, thus preventing cracking or peeling. Furthermore, use of such a material can ensure close adhesion of the flat plate 23 to the first clad 12, with the flat plate 23 changing its form according to any small unevenness that may possibly exist in the contact surface thereof to the first clad 12. As a result, core solution that is present in the contact area between the first clad 12 and the flat plate 23 can be efficiently ejected outside. Furthermore, according to the present embodiments, the first clad 12 has pockets 13b, from which unnecessary core solution from the contact area between the first clad 12 and the flat plate 23 can be easily ejected outside away from pockets 13b. Here, it is preferable that no core solution layer 14a be left behind between the first clad 12 and the flat plate 23. Thereby, the formation of residual core layer can be prevented.

Then the flat plate 23 is removed. As a result, the core 14 and the light absorber layers 18 are formed on the first clad 12 (FIG. 4F). Following that, a second clad solution layer 16a is formed by dripping clad solution on the first clad 12, the core 14 and the light absorber layer 18, and then a substrate 20 is placed thereon (FIG. 4G). In this state, a second clad 16 is formed by hardening the second clad solution layer 16a through irradiation of ultraviolet rays thereto (See FIG. 2A). Thus an optical device as illustrated in FIG. 2A is produced.

FIGS. 6A to 6G illustrate processes showing another example of production procedure for an optical device 10. In this procedure, processes FIG. 6A through FIG. 6D are carried out the same way as those shown in FIG. 4A through FIG. 4D.

Figure 6A:
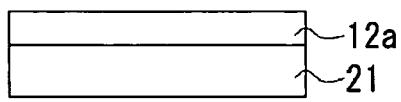
FIGS. 6A to 6G are process drawings showing another example of fabrication procedure for an optical device shown in FIG. 2A.
Figure 6B:
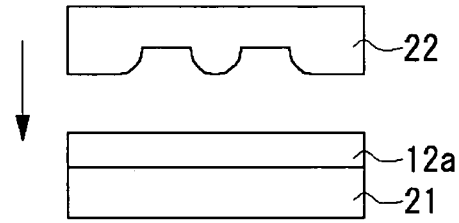
Figure 6C:
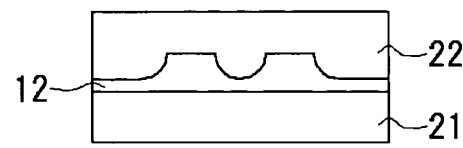
Figure 6D:
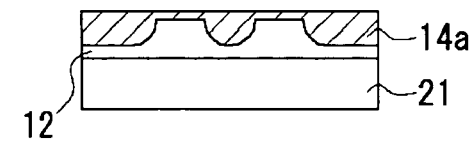
Figure 6E:
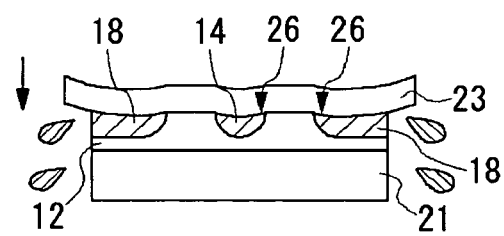

After forming a core solution layer 14a on a first clad 12 (FIG. 6D), a flat plate (forming die) 23 is positioned above the first clad 12 and the core solution layer 14a, and the flat plate 23 is pressed against the first clad 12 to remove unnecessary core solution from the contact area between the first clad 12 and the flat plate 23. In this condition, a core 14 and light absorber layers 18 are formed by hardening the core solution layer 14a through irradiation of ultraviolet rays (FIG. 6E). At this time, the forms of the core 14 and the light absorber layers 18 may be appropriately changed to have narrowed portions 26 as illustrated in FIG. 6E by adjusting the pressure with which to press the flat plate 23 against the first clad 12 or using a material with a low durometer hardness A for the flat plate 23.

Figure 6F:
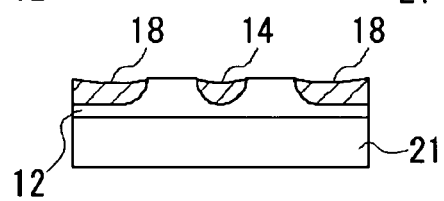
Figure 6G:
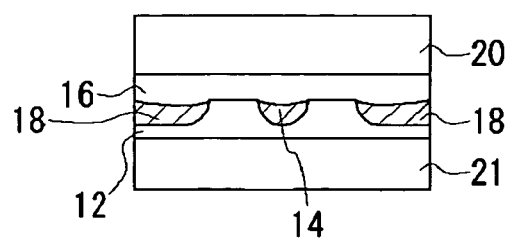

Then the flat plate 23 is removed. As a result, the core 14 and the light absorber layers 18 are formed on the first clad 12 (FIG. 6F). Following that, clad solution is dripped on the first clad 12, the core 14 and the light absorber layers 18, and then a substrate 20 is placed thereon. In this state, a second clad 16 is formed by hardening the second clad solution through irradiation of ultraviolet rays thereto (FIG. 6G).

Figure 7A:
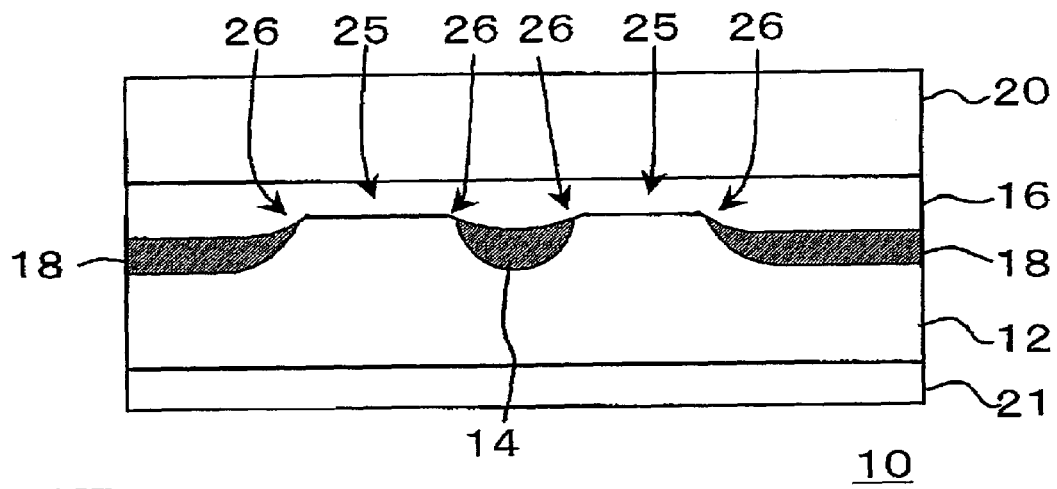
FIGS. 7A and 7B each show in detail an optical device with a narrowed portion formed therefor.
Figure 7B:
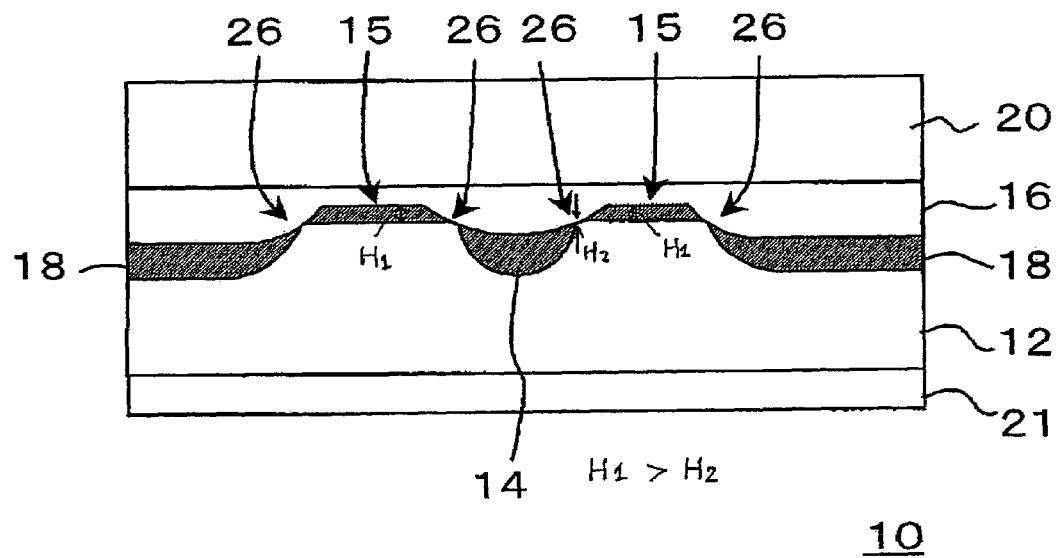

FIGS. 7A and 7B each show in detail an optical device 10 with a narrowed portion 26 formed therefor.

As illustrated in FIG. 7A, the top surfaces of the core 14 and the light absorber layers 18 are formed in their respective curved surfaces dented below the height of the flat areas 25 of the first clad 12. Thereby, a core 14 and light absorber layers 18 may be so formed as to have their respective narrowed portions 26, which are portions narrowed, with the thickness thereof being decreasing, near the flat areas 25 of a first clad 12 in the cross section substantially perpendicular to the light propagation direction of the core 14.

If a residual core layer 15 is formed on the flat areas of the first clad 12, the core 14 and the light absorbing layer 18 and the residual core layer 15 are so formed to have their respective narrowed portions 26, whose thickness is decreased, near the boundary between the core 14 and the residual core layer 15 and near the boundary between the light absorbing layer 18 and the residual core layer 15, respectively, as illustrated in FIG. 67B.

Implementing such structures results in the formation of the core 14, residual core layers 15 and the light absorber layers 18 separate from each other. Thus, the light propagating through the core 14 can be prevented from being leaked into the residual core layer 15 or light absorbing layer 18, and the unwanted entering of the light into the corer 14 from the light absorbing layer 18 can also be prevented.

FIGS. 8A to 8G illustrate processes showing each a production procedure for an optical device 10 shown in FIG. 2B.

Figure 8A:
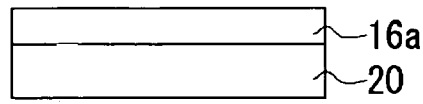
FIGS. 8A to 8G are process drawings showing another example of fabrication procedure for an optical device shown in FIG. 2B.
Figure 8B:
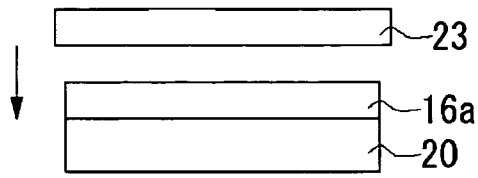

First a second clad solution layer 16a is formed on a substrate 20 by dripping clad solution, which will form a second clad 16, on the substrate 20 (FIG. 7A). Then a flat plate 23 is pressed against the second clad solution layer 16a to flatten the surface thereof, and the second clad solution layer 16a is hardened through irradiation of ultraviolet rays thereto (FIG. 8B). The second clad 16 is thus formed. Here, the flat plate 23 may be formed of an elastic material whose durometer hardness A is 85 or below, or more preferably 56 or below. Silicone rubber is an example of such material.

Figure 8C:
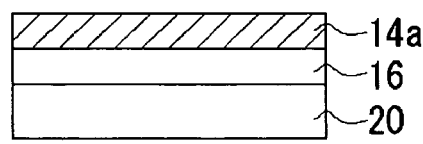
Figure 8D:
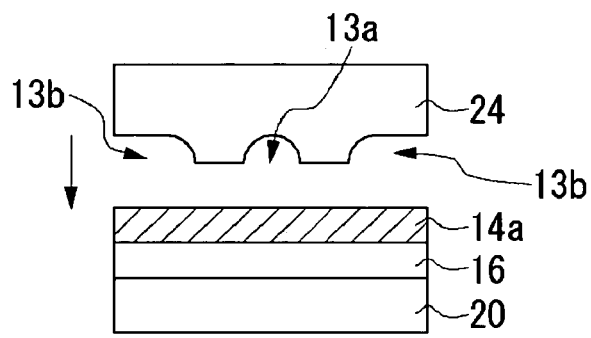

Following that, a core solution layer 14a is formed on the second clad 16 by dripping core solution, which will form a core 14, on the second clad (FIG. 8C). Thereafter, a recessed stamper (forming die) 24 is positioned above the core solution layer 14a (FIG. 8D).

Figure 9A:
FIGS. 9A to 9C are process drawings showing a production procedure for a recessed stamper.
Figure 9B:
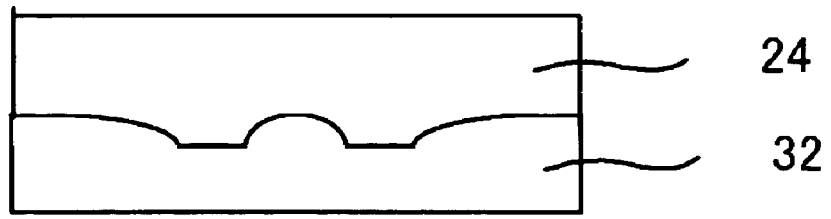
Figure 9C:
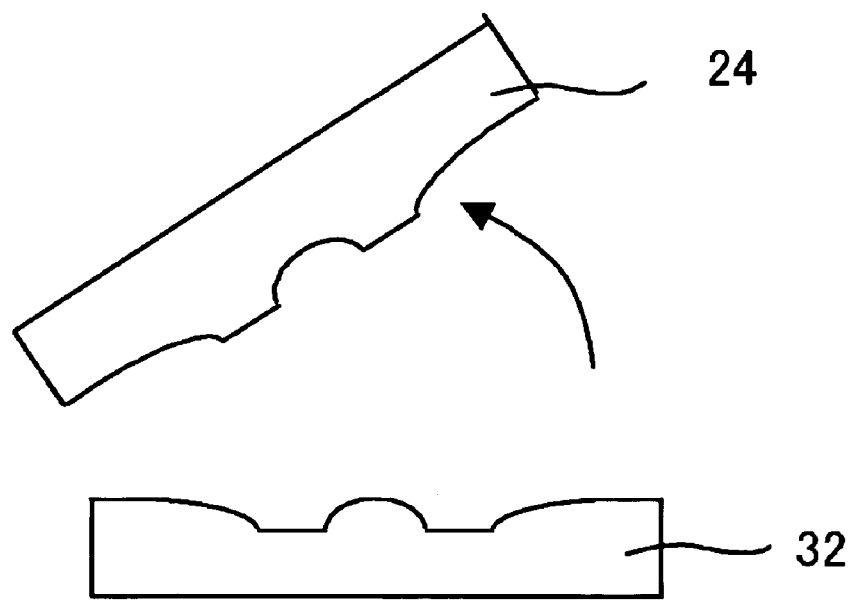

Referring to FIGS. 9A to 9C, a method for producing a recessed stamper 24 is described below.

First a glass mold 32 with projections and recessions identical to those on an intended first clad 12 is produced by lithography (FIG. 9A). A recessed stamper 24 may be produced by first pouring a liquid, which can be hardened into an elastic material, into the thus produced glass mold 32 and then hardening it (FIG. 9B). Then the recessed stamper 24 is separated from the glass mold 32 (FIG. 9C). The recessed stamper 24 may be formed of an elastic material whose durometer hardness A is 85 or below. More preferably, the recessed stamper 24 may be formed of an elastic material whose durometer hardness A is 56 or below. Use of such an elastic material improves the mold-detachability of the recessed stamper 24 from the second clad 16, the core 14 and the light absorber layers 18 when forming the core 14 and the light absorber layers 18 therewith. Again, silicone rubber is an example of such elastic material.

Referring back to FIGS. 8A to 8G, a recessed stamper 24, produced as described above, is pressed against a second clad 16 to remove unnecessary core solution from the contact area between the recessed stamper 24 and the second cladd 16, and the core solution layer 14a is hardened by irradiating it with ultraviolet rays (FIG. 8E). Then the recessed stamper 24 is removed. As a result, the core 14 and the light absorber layers 18 are formed on the second clad 16 (FIG. 8F). Now, the recessed stamper 24 is made of an elastic material as described above, so that the recessed stamper 24 will change its form according to any small unevenness that may possibly exist in the contact surface thereof to the second clad 16. As a result, the recessed stamper 24 comes in close contact with the second clad 16 to efficiently eject outside the core solution that is present in the contact area therebetween. Furthermore, the recessed stamper 24 is provided with pockets 13b, from which unnecessary core solution from the contact area between the recessed stamper 24 and the second clad 16 can be easily ejected outside away from pockets 13b when the recessed stamper 24 is pressed against the second clad 16. Hence, this structure prevents the residual core layer from being formed on the surface of the second clad 16.

Following that, a first clad solution layer 12a is formed by dripping clad solution, which will form a first clad 12, on the core 14 and the light absorber layers 18. Then a substrate 21 is placed thereon (FIG. 8G). In this state, a first clad 12 (see FIG. 2B) is formed by hardening the first clad solution layer 12a through irradiation of ultraviolet rays thereto. Thus an optical device as illustrated in FIG. 1B is produced.

The embodiments described above concern light absorber layers 18 and a core 14 which are both formed of the same material. However, the light absorber layers 18 may be formed of a material different from that for the core 14 provided that such material is capable of absorbing light leaking from the core 14. Referring to FIGS. 10A to 10F, a description is given below of a manufacturing procedure for an optical device 10 whose light absorber layers 18 and core 14 are formed of different materials.

Figure 4C:
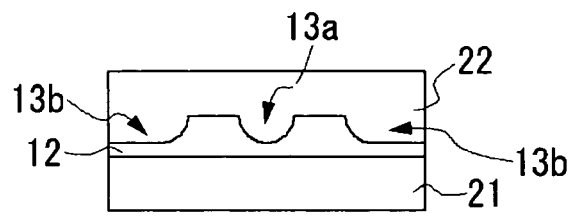
Figure 4D:
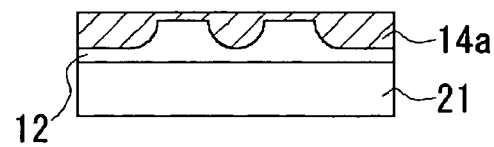
Figure 4E:
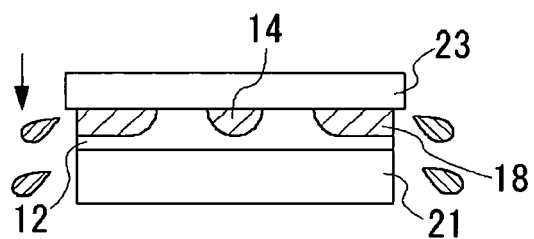
Figure 4F:
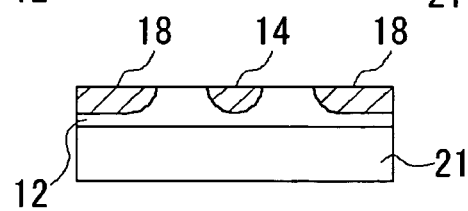
Figure 4G:
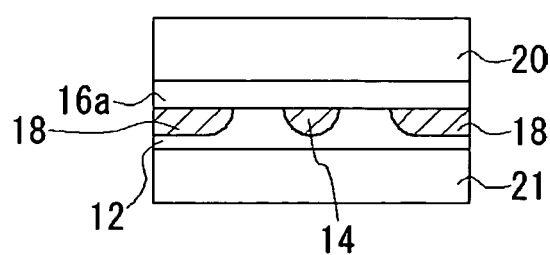
Figure 10A:
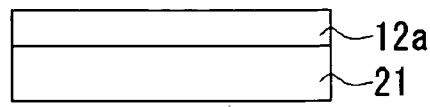
FIGS. 10A to 10F are process drawings showing a fabrication procedure for an optical device where a light absorber layer is formed by material different from material that constitutes a core.
Figure 10B:
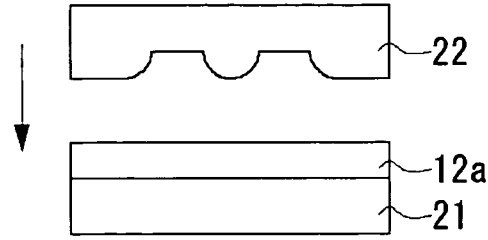
Figure 10C:
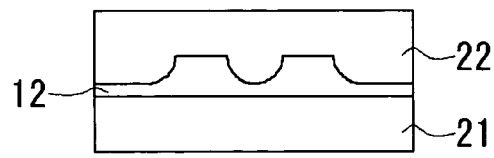
Figure 10D:
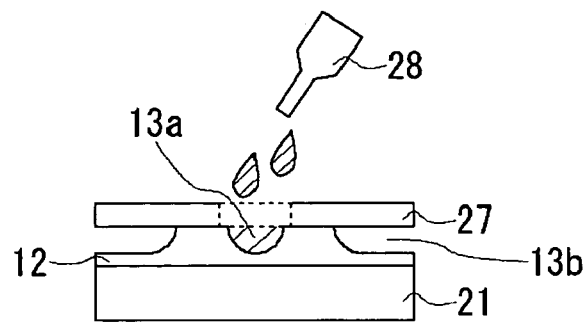
Figure 10E:
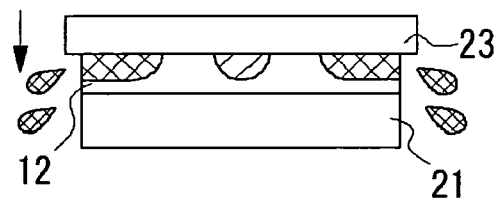
Figure 10F:
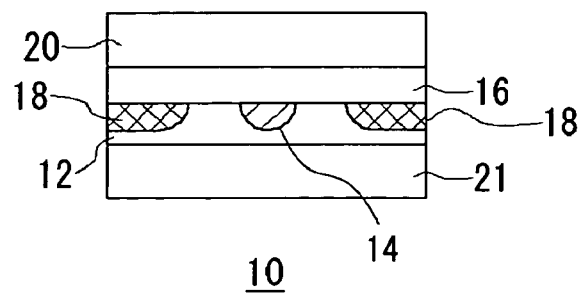

In this procedure, processes FIG. 10A through FIG. 10C are carried out the same way as those shown in FIG. 4A through FIG. 4C. As illustrated in FIG. 10D, after forming a first clad 12 on a substrate 21, a masking substrate 27, which is so formed as to have an opening at a recess 13a, wherein the core 14 of the first clad 12 will be formed, and to cover pockets 13b, wherein the light absorber layers 18 will be formed, is placed on the first clad 12. In this state, the recess 13a of the first clad 12 is filled with core solution, using a syringe 28 for instance. Then the core 14 is formed by hardening the core solution filling the recess 13a of the first clad 12 through irradiation of ultraviolet rays thereto. Then the pockets 13b of the first clad 12 are filled with a light-absorbing solution by dripping the solution on the first clad 12 and the core 14. Then a flat plate 23 is positioned above the first clad 12, the core 14 and the light-absorbing solution, and the flat plate 23 is pressed against the first clad 12 to remove unnecessary light-absorbing solution from the contact area between the first clad 12 and the flat plate 23 (FIG. 10E). At this time, unnecessary light-absorbing solution can be efficiently removed by virtue of the pockets 13b provided in the first clad 12. In this condition, light absorber layers 18 are formed by hardening the light-absorbing solution through irradiation of ultraviolet rays thereto. Then a clad solution to form a second clad 16 is applied on the first clad 12, the core 14 and the light absorber layers 18. A substrate 20 is placed thereon, and the second clad 16 is formed by irradiating it with ultraviolet rays (FIG. 10F). In this manner, an optical device 10 whose core 14 and light absorber layers 18 are formed of different materials is produced. The material to form the light absorber layers 18 may be one that has a higher refractive index than the material forming the first clad 12 or the second clad 16. Also, the material to be used to form the first clad 12 or the second clad 16 may be one that is added with an oxide, such as silica ($SiO_2$), or a suspended matter, such as carbon powder.

According to the above description, the first clad solution layer 12a, the core solution layer 14a and the second clad solution layer 16a are hardened by irradiating them with ultraviolet rays, but they can also be hardened by heating.

Generic embodiments have been described so far. Hereinafter, the present invention will be further described using specific examples for carrying out the present invention, but the present invention is not limited thereto.

First Embodiment

Figure 11A:
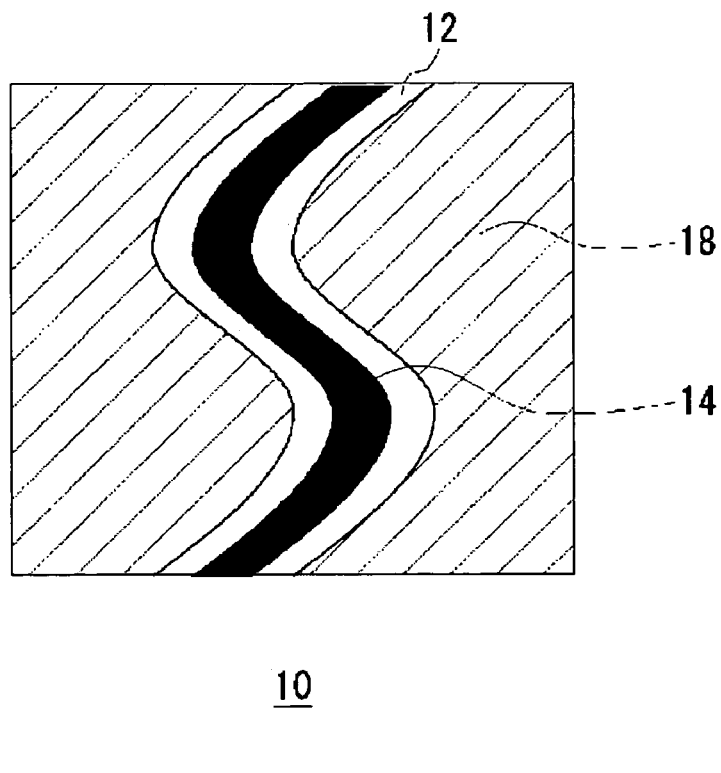
FIGS. 11A and 11B are each a top view of an optical devices produced according to an embodiment.

An optical device 10 including an S-shaped core 14 as illustrated in FIG. 11A was produced in a first embodiment according to the present invention. The optical device 10 was produced using a procedure shown in FIGS. 4A to 4G.

A projecting stamper 22 as shown in FIGS. 4B and 4C. was produced by pouring silicone rubber liquid, whose durometer hardness A after hardening is 56, into a glass mold 30 as shown in FIGS. 5B to 5D.

For core solution, the following metal alkoxide liquid and organic polymer solution were used.

Metal alkoxide liquid: Phenyltrimethoxysilane (PhTMS).

Organic polymer solution: Hydrolytic polycondensate of 3-methacryloxypropyltriethoxysilane (MPTES).

Ratio of combination of metal alkoxide liquid and organic polymer solution=10:9.

The organic polymer solution was synthesized by first mixing 9.5 grams of hydrolytic polycondensate of MPTES, 13.3 grams of ethanol as solvent and 1.35 grams of 2 normal hydrochloric acid, then leaving the mixture standing for 19 hours and finally evaporating and removing ethanol by heating the mixture at 95° C.

For clad solution, the following metal alkoxide liquid and organic polymer solution were used.

Metal alkoxide liquid: Phenyltriethoxysilane (PhTES)

Organic polymer solution: Hydrolytic polycondensate of 3-methacryloxypropyltriethoxysilane (MPTES).

Ratio of combination of metal alkoxide liquid and organic polymer solution=8:17.

The organic polymer solution was synthesized by first mixing 14.8 grams of hydrolytic polycondensate of MPTES, 8.4 grams of ethanol as solvent and 1.6 grams of 2 normal hydrochloric acid, then leaving the mixture standing for 19 hours and finally evaporating and removing ethanol by heating the mixture at 95° C.

Using the projecting stamper 22, core solution and clad solution prepared as described above, an optical device 10 was produced by carrying out a procedure as illustrated in FIGS. 4A to 4G. For a flat plate 23 shown in FIG. 4E, a silicone rubber whose durometer hardness A is 56 was used. The pressure at which the flat plate 23 was pressed against a first clad 12 was 200 gf/cm . And the core diameter of the core 14 employed was 70 μm .

Clad solution was applied on a substrate 21, a projecting stamper 22 was pressed thereto, and the clad solution was hardened by irradiating it with ultraviolet rays of 365 nm to form a first clad 12. Following that, core solution was applied on the first clad 12, thus filling a recess 13a and pockets 13b with the core solution. Then the flat plate 23, made of a silicone rubber whose durometer hardness A is 56, was pressed against them at a pressure of 200 gf/cm2 , and the core solution layer 14a was hardened by irradiation of ultraviolet rays. Then a second clad 16 was produced by applying the clad solution and hardening it by ultraviolet rays.

REFERENCE EXAMPLE 1

An optical device without light absorber layers 18 was produced using the same materials as in the first embodiment. The flat plate 23 was pressed against the clad at a pressure of 200 gf/cm$^2$.

Evaluation of Propagated Light Leaked from the Core

Figure 12:
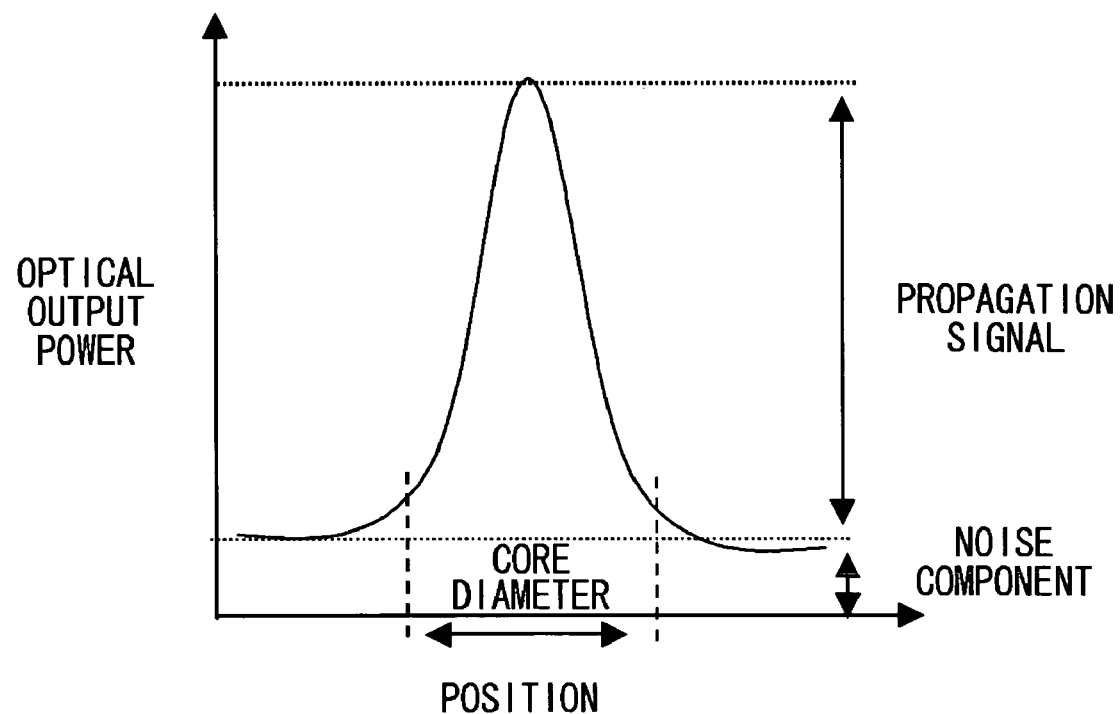
FIG. 12 schematically shows a relationship between optical output power and position at the exiting end of an optical device.

With the optical devices prepared in the above-described first embodiment and Reference example 1, a light beam, whose wavelength was 1300 nm, was sent in from one end of the core 14, and the leakage of propagated light beam at the exiting end thereof was measured with a beam profiler. FIG. 12 schematically shows a relationship between optical output power and position in core diameter at the exiting end. As illustrated in FIG. 12, the leakage of propagated light at the exiting end was evaluated by calculating a noise ratio, which is the ratio of the noise component emitted from the first clad 12 and the light absorber layers 18 around the core 14 to the propagated signal exiting from the cross section of the core 14. The results of the evaluation are shown in Table 1.

TABLE 1

| | PROPAGATION SIGNAL | NOISE COMPONENT | NOISE RATIO (NOISE COMPONENT/ PROPAGATION SIGNAL) |
| --- | --- | --- | --- |
| FIRST EMBODIMENT | 100 μW | 4.5 μW | 0.045 |
| REFERENCE EXAMPLE 1 | 100 μW | 5.0 μW | 0.050 |

As shown in Table 1, the noise component of the optical device obtained in the first embodiment was 10 percent lower than that of the one obtained in Reference example 1.

It is to be noted that similar results were obtained when phenyltriethoxysilane (PhTES) instead of PhTMS and 3-methacryloxypropyltrimethoxysilane (MPTMS) instead of MPTES were used as the material for core solution in the first embodiment and the Reference example 1.

It is to be noted further that similar results were obtained when p-styryltriethoxysilane, diphenyldiethoxysilane or diphenyldimethoxysilane containing a phenyl group ,instead of PhTMS, was used in the first embodiment and the Reference example 1.

Second Embodiment

Figure 11B:
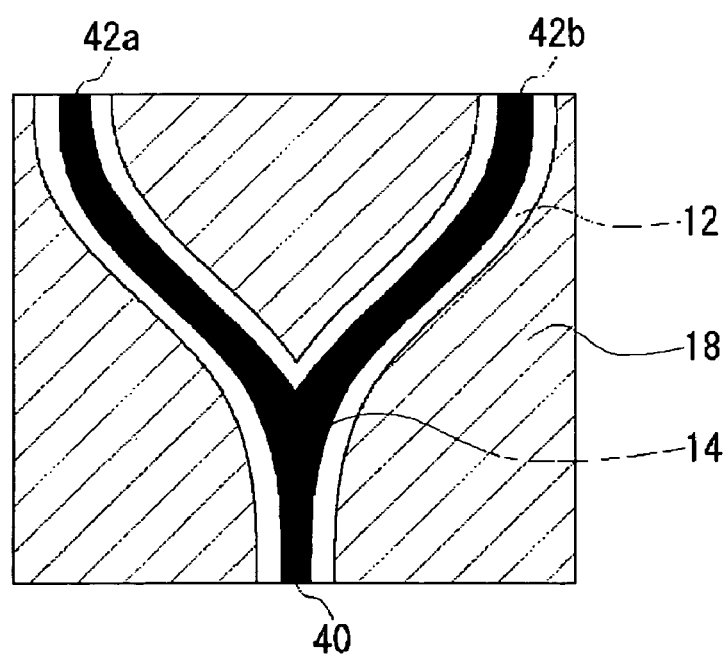

An optical device 10 including a Y-branch-type core 14 as illustrated in FIG. 11B is produced in a second embodiment according to the present invention. The optical device 10 was produced using a procedure as shown in FIGS. 8A to 8G.

Figure 8E:
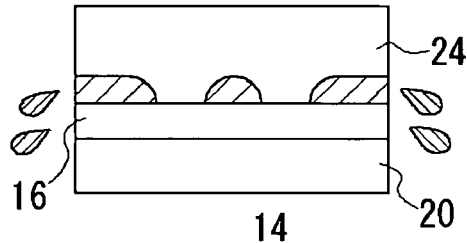
Figure 8F:
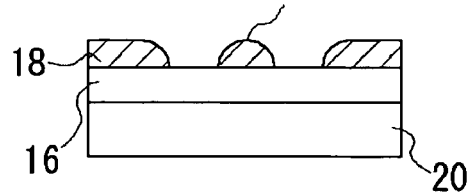
Figure 8G:
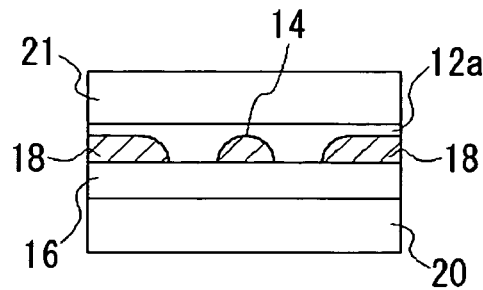

A recessed stamper 24 as shown in FIGS. 8D and 8E was produced by pouring silicone rubber liquid, whose durometer hardness A after hardening is 56, into a glass mold 32 as shown in FIG. 9A.

For core solution, an epoxy-type UV-cured resin, whose refractive index was 1.53, was used.

For clad solution, the following metal alkoxide liquid and organic polymer solution were used.

Metal alkoxide liquid: Phenyltriethoxysilane (PhTES)

Organic polymer solution: Hydrolytic polycondensate of 3-methacryloxypropyltriethoxysilane (MPTES).

Ratio of combination of metal alkoxide liquid and organic polymer solution=8:17.

The organic polymer solution was synthesized by first mixing 14.8 grams of hydrolytic polycondensate of MPTES, 8.4 grams of ethanol as solvent and 1.6 grams of 2 normal hydrochloric acid, then leaving the mixture standing for 19 hours and finally evaporating and removing ethanol by heating the mixture at 95° C.

Using the recessed stamper 24, core solution and clad solution prepared as described above, an optical device 10 was produced by carrying out a procedure as illustrated in FIGS. 8A to 8G. The pressure at which the recessed stamper 24 was pressed against a second clad 16 was 200 gf/cm$^2$. And the core diameter of the core 14 employed was 70 μm.

The branching performance of the optical device 10 produced as described above-was investigated. A light beam (100 μW), whose wavelength was 1300 nm, was sent into the core 14 as shown in FIG. 11B from the entering end 40 thereof and outgoing light beams at the exiting ends 42a and 42b thereof were measured. A light beam of 30 μW was detected at both the exiting ends 42a and 42b. From this observation, it was confirmed that the optical device 10 as produced in the second embodiment has a branching function of a beam splitter.

A similar measurement was conducted for an optical device produced with a Y-branch-type core 14 as in the second embodiment, whose core diameter of the core 14 was 6 μm. In this case, too, it was confirmed that the optical device has a similar branching function of a beam splitter.

REFERENCE EXAMPLE 2

Figure 1A:
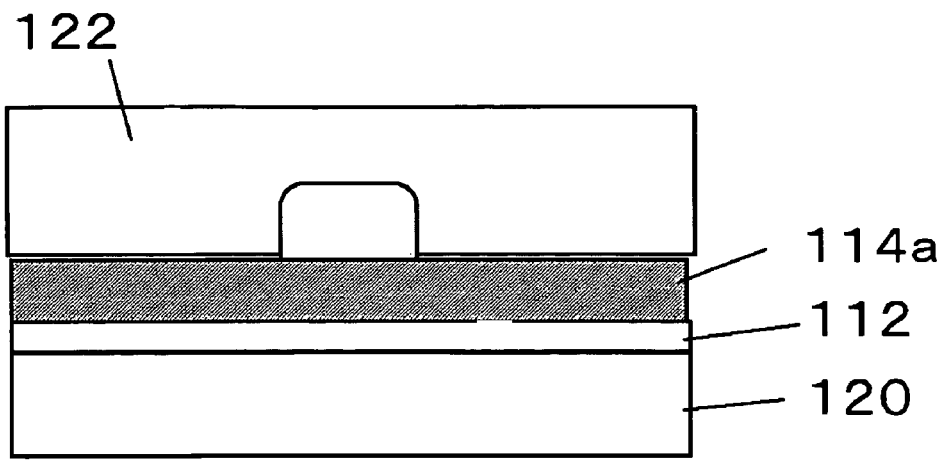
FIGS. 1A to 1C are process drawings showing a fabrication procedure for an optical waveguide using a stamper according to the conventional practice.
Figure 1B:
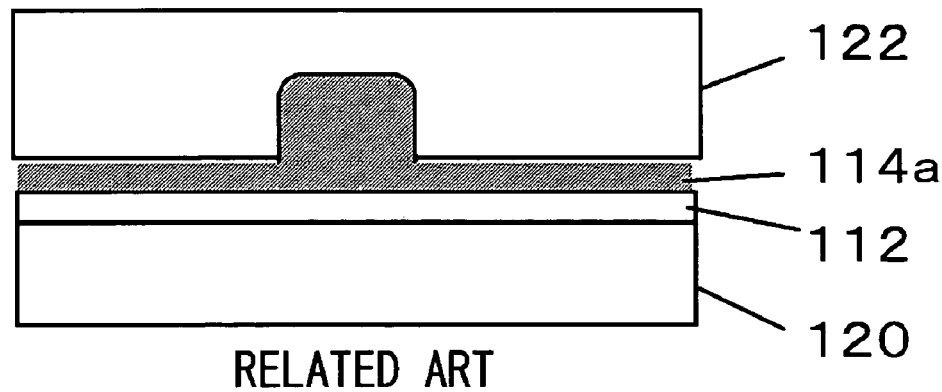
Figure 1C:
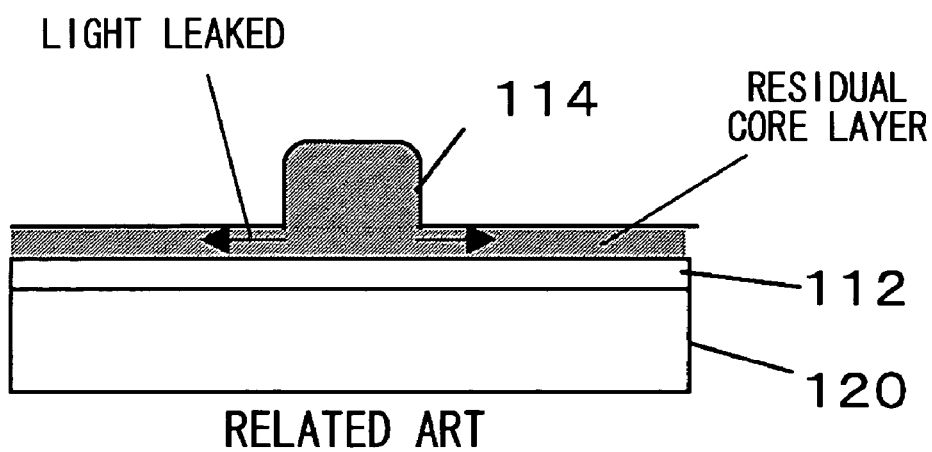

An optical device without light absorber layers 18 was produced, as shown in FIGS. 1A to 1C, using the same materials as in the second embodiment. A stamper 122 was pressed against a lower clad 112 at a pressure of 200 gf/cm$^2$.

A test was conducted on an optical device obtained in the second embodiment by installing a laser diode at the exiting end 42b and a photodiode at the exiting end 42a as shown in FIG 11B. From this testing, it was confirmed that such an optical device can serve as a transceiver module which has the function of receiving the incoming light from the entering end 40 by a photodiode and the function of emitting the output light of a laser diode from the entering end 40.

Evaluation of Noise Component Outputted to Photodiode

A test to evaluate the noise component of optical transmission signal outputted to the photodiode was conducted on the transceiver modules using the optical devices obtained in the above second embodiment and Reference example 2, respectively. In the testing, a light beam, whose wavelength was 1300 nm, was sent in by the laser diode at the exiting end 42b, as shown in FIG. 11B, and returning light, which is reflected at the entering end 40 and propagated to the exiting end 42a, was measured. The results are shown in Table 2.

TABLE 2

| | INPUT LIGHT | RETURNING LIGHT | NOISE RATIO (RETURNING LIGHT/ INPUT LIGHT) |
|---|---|---|---|
| SECOND EMBODIMENT | 100 μW | 3.5 μW | 0.035 |
| REFERENCE EXAMPLE 2 | 100 μW | 4.0 μW | 0.040 |

As is evident in Table 2, the optical device obtained in the second embodiment showed a noise component about 12 percent lower than that of the optical device obtained in Reference example 2.

Evaluation of Propagated Light Leaked from the Core

With the optical devices prepared in the above-described second embodiment and Reference example 2, a light beam, whose wavelength was 1300 nm, was sent in from the entering end 40 of the optical waveguide, and the leakage of propagated light beam at the exiting end thereof was measured with a beam profiler. The results of the evaluation are shown in Table 3.

TABLE 3

| | PROPAGATION SIGNAL | NOISE COMPONENT | NOISE RATIO (NOISE COMPONENT/ PROPAGATION SIGNAL) |
|---|---|---|---|
| SECOND EMBODIMENT | 100 μW | 4.1 μW | 0.041 |
| REFERENCE EXAMPLE 2 | 100 μW | 4.5 μW | 0.045 |

As shown in Table 3, the noise component of the optical device obtained in the second embodiment was about 9 percent lower than that of the one produced in Reference example 2.

It is to be noted that similar results were obtained when 3-acryloxypropyltrimethoxysilane instead of MPTES was used as the material for clad solution in the second embodiment and Reference example 2.

Third Embodiment

An optical device 10 including an S-shaped core 14 as illustrated in FIG. 11A is produced in a third embodiment according to the present invention. Using the same materials as in the first embodiment, the optical device 10 was produced by carrying out a procedure as illustrated in FIGS. 4A to 4G. For a flat plate 23 shown in FIG. 4E, a silicone rubber whose durometer hardness A is 45 was used. The pressure at which the flat plate 23 was pressed against a clad 12 was 200 gf/cm$^2$. And the core diameter of the core 14 employed was 70 μm.

In this third embodiment, a core 14 and light absorber layers 18, both having their respective narrowed portions 26, were formed. There was a partial presence of residual core 15 between the first clad 12 and the second clad 16. The thickness of the residual core 15, which was measured with a level difference meter, was about 4 μm.

REFERENCE EXAMPLE 3

Figure 13:
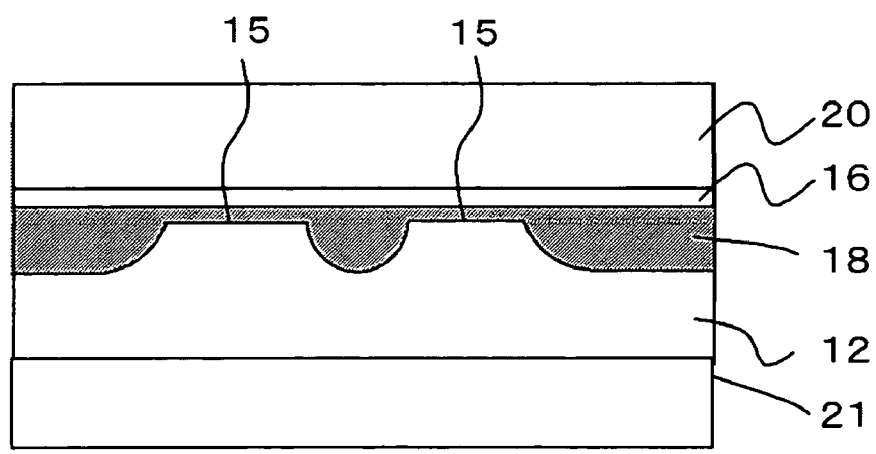
FIG. 13 illustrates an example where there exists a residual core layer between a first clad and a second clad.

An optical device 10 including an S-shaped core 14 as illustrated in FIG. 11A was produced. Using the same materials as in the first embodiment, the optical device 10 was produced by carrying out a procedure as illustrated in FIGS. 4A to 4G. A flat glass plate was used as a flat plate 23 shown in FIG. 4E. The pressure at which the flat glass plate was pressed against a first clad 12 was 200 gf/cm$^2$. And the core diameter of the core 14 employed was 70 μm. In this third embodiment, there was a partial presence of residual core layer 15 between the first clad 12 and the second clad 16 as illustrated in FIG. 13. The thickness of the residual core layer 15, which was measured with a level difference meter, was about 4 μm.

REFERENCE EXAMPLE 4

An optical device 10 including an S-shaped core 14 as illustrated in FIG. 11A was produced. Using the same materials as in the first embodiment, the optical device 10 was produced by carrying out a procedure as illustrated in FIGS. 4A to 4G. A flat glass plate was used as a flat plate 23 shown in FIG. 4E. The pressure at which the flat glass plate was pressed against a first clad 12 was 400 gf/cm². And the core diameter of the core 14 employed was 70 μm. In this Reference example 4, too, there was a partial presence of residual core layer 15 between the first clad 12 and the second clad 16 as illustrated in FIG. 13. The thickness of the residual core layer 15, which was measured with a level difference meter, was about 2 μm.

Evaluation of Propagated Light Leaked from the Core

With the optical devices prepared in the above-described third embodiment, Reference example 3 and Reference example 4, a light beam whose wavelength was 1300 nm was sent in from one end of the core 14, and the leakage of propagated light beam at the exiting end thereof was measured with a beam profiler. The evaluation of the leakage of propagated light at the exiting end was carried out the same way as described in the first embodiment and Reference example 1. The results of the evaluation are shown in Table 4.

TABLE 4

| | PROPAGATION SIGNAL | NOISE COMPONENT | NOISE RATIO (NOISE COMPONENT/ PROPAGATION SIGNAL) |
|---|---|---|---|
| THIRD EMBODIMENT | 100 μW | 4.5 μW | 0.045 |
| REFERENCE EXAMPLE 3 | 100 μW | 6.0 μW | 0.060 |
| REFERENCE EXAMPLE 4 | 100 μW | 4.7 μW | 0.047 |

As shown in Table 4, the noise component of the optical device obtained in the third embodiment was 25 percent lower than that of the one obtained in Reference example 3. Moreover, the noise component of the optical device obtained in the third embodiment was 4 percent lower than that of the one obtained in Reference example 4.

Therefore, the use of a silicone rubber whose durometer hardness A is 45 leads to the formation of narrowed portions 26 as illustrated in FIGS. 7A and 7B. This results in the formation of the core 14 and residual core layers 15 separate from each other. Hence, even in the presence of the residual core layers 15, the amount of light leaking from the core 14 can be reduced. And this is considered to contribute to a reduction in noise component.

Another experiment has indicated that similar effect is obtained when a silicone rubber whose durometer hardness A is 85 or below is used as a flat plate 13 in the third embodiment.

An optical device without the light absorber layers 18 was produced using the same materials as described in Reference example 3 and Reference example 4, and the leakage of propagated light at the exiting end of the optical device was evaluated. As a result, it was confirmed that the devices obtained in Reference example 3 and Reference example 4 show a noise component smaller than that of such optical devices without the light absorber layers 18. It is believed that a noise component smaller than that of the optical devices without the light absorber layers 18 has resulted because, with optical devices produced in Reference example 3 and Reference example 4, the residual core layer 15 can be made thinner due to the formation of the light absorber layers 18 and in addition the light leaking from the core can be absorbed by the light absorber layers 18.

Fourth Embodiment

An optical device 10 including an S-shaped core 14 as illustrated in FIG. 11A was produced in a fourth embodiment according to the present invention. The optical device 10 was produced using a procedure as shown in FIGS. 4A to 4G.

For core solution that constitutes the core 14, the following metal alkoxide liquid and organic polymer solution were used.

Metal alkoxide liquid: Phenyltrimethoxysilane (PhTMS)
Organic polymer solution: Hydrolytic polycondensate of 3-methacryloxypropyltriethoxysilane (MPTES).
Ratio of combination of metal alkoxide liquid and organic polymer solution=10:9

The organic polymer solution was synthesized by first mixing 9.5 grams of hydrolytic polycondensate of MPTES, 13.3 grams of ethanol as solvent and 1.35 grams of 2 normal hydrochloric acid, then leaving the mixture standing for 19 hours and finally evaporating and removing ethanol by heating the mixture at 95° C.

For clad solution, the following metal alkoxide liquid and organic polymer solution were used.

Metal alkoxide liquid: Phenyltriethoxysilane (PhTES).
Organic polymer solution: Hydrolytic polycondensate of 3-methacryloxypropyltriethoxysilane (MPTES).
Ratio of combination of metal alkoxide liquid and organic polymer solution=8:17.

The organic polymer solution was synthesized by first mixing 14.8 grams of hydrolytic polycondensate of MPTES, 8.4 grams of ethanol as solvent and 1.6 grams of 2 normal hydrochloric acid, then leaving the mixture standing for 19 hours and finally evaporating and removing ethanol by heating the mixture at 95° C.

As for light absorber solution, fine grains of silica ($SiO_2$), whose average grain size was 1 μm, was mixed into the above-mentioned clad solution in a weight ratio of 1:1 so as to produce a cloudy light absorber solution.

An optical device 10 was produced using a projecting stamper 22 prepared the same way as in the first embodiment. For a flat plate 23, a silicone rubber whose durometer hardness A is 56 was used. The pressure at which the flat plate 23 was pressed against a first clad 12 was 200 gf/cm². And the core diameter of the core 14 employed was 70 μm.

Evaluation of Propagated Light Leaked from the Core

With the optical devices prepared in the above-described fourth embodiment and Reference example 1, a light beam, whose wavelength was 1300 nm, was sent in from one end of the core 14, and the leakage of propagated light beam at the exiting end thereof was measured with a beam profiler. It was found as a result that the optical device prepared in the fourth embodiment shows a noise component 12 percent smaller than that of the optical device prepared in Reference example 1.

It is to be noted that the noise component of the optical device was also smaller than the one prepared in Reference example 1 when the carbon powder whose average grain size was 100 nm, instead of the fine grains of silica, was used as the light absorber solution.

Light absorbing areas are provided on both sides of a core in the above-described generic and preferred embodiments. However, the light absorbing areas are not essential, and the following embodiments to be described hereafter where narrowed portions are provided in the core and no light absorbing areas are provided in the both sides of the core are also encompassed by the scope of the present invention.

FIGS. 14A to 14G illustrate processes showing another example of production procedure for an optical device 10. Processes corresponding to FIGS. 14A through 14D are similar to those corresponding to FIGS. 4A through 4D except for that the pockets 13 are not to be formed. Thereby, a first clad 12 is formed which has a recess 13a to be formed later in a core 14. A method for producing a projecting stamper 22 used in this embodiment is basically the same as the procedure shown in FIGS. 5A to 5D. In this embodiment, however, a mask where an area corresponding to the core 14 only is designated as an opening thereof is used and placed on the flat glass substrate 29 in the process of producing the projecting stamper 22 of FIG. 5A. Thus, produced is the projecting stamper 22 having a projection that matches an area corresponding to the core 14.

Figure 14A:
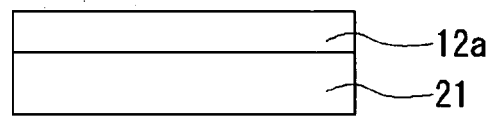
FIGS. 14A to 14G are process drawings showing another example of fabrication procedure for an optical device.
Figure 14B:
Figure 14C:
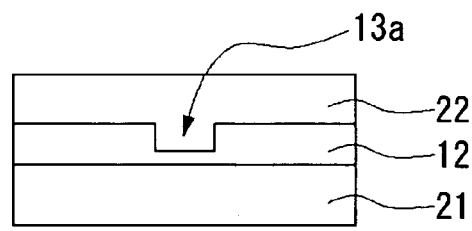
Figure 14D:
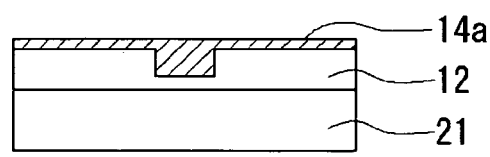
Figure 14E:
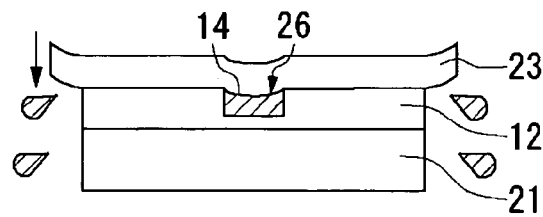

After forming a core solution layer 14a on a first clad 12 (FIG. 14D), a flat plate 23 is placed on the first lading layer 12 and the core solution layer 14a, and the flat plate 23 is then pressed against the first clad 12 so as to remove unnecessary core solution in the contact area between the flat plate 23 and the first clad 12. In this state, the core solution layer 14a is hardened by irradiating the ultraviolet rays thereto so as to form a core 14 (FIG. 14E). At this time, the pressure at which the flat plate 23 is pressed against the first clad 12 may be adjusted or a material whose durometer hardness A is low may be used as the flat plate 23, so that the shape of the core 14 can be changed as appropriate and a structure such that a narrowed portion 26 as shown in FIG. 14E is provided can be realized.

Figure 14F:
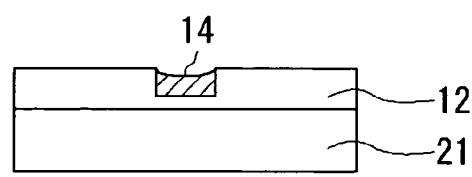
Figure 14G:
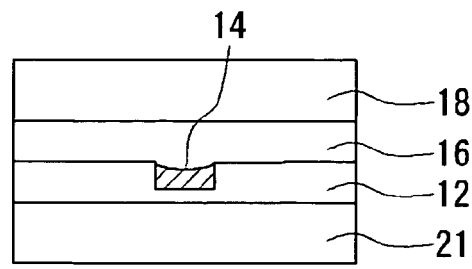

Following that, the flat plate 23 is removed, thereby forming the core 14 on the first clad 12 (FIG. 14F). Then, clad solution is dripped on the first clad 12 and the core 14, and a substrate 20 is placed thereon. In this condition, the second clad solution is hardened by irradiating it with ultraviolet rays, so as to form a second clad 16 (FIG. 14G).

Figure 15A:
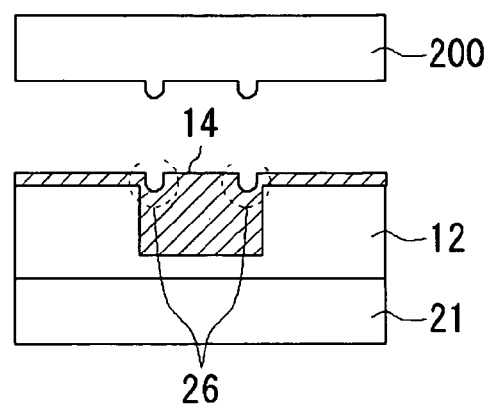
FIGS. 15A to 15D are process drawings showing a method of forming a core provided with narrowed portions.

A method of providing the narrowed portion 26 in the core 14 is not limited to the method in which the flat plate 23 is utilized as shown in FIG. 14E, but also a forming die 200 having a shape as shown in FIGS. 15A to 15D may be used. A forming die 200 shown in FIG. 15A is such that in a side to be in contact with a core 14 a pair of projections is provided in positions to match the both ends of the core 14. Accordingly, the core 14 provided with narrowed portions 26 at the both sides thereof is formed by pressing this forming die 200 against a first clad 12.

Figure 15B:
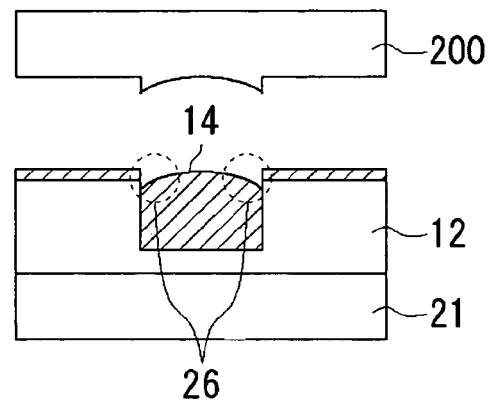

A forming die 200 shown in FIG. 15B is such that in a side to be in contact with a core 14 a pair of projections is provided in positions to match the both ends of the core 14 and an area between the pair of these projections is recessed in a crater-like shape. Accordingly, the core 14 provided with a structure such that a portion near the center thereof is protuberant and there are narrowed portions 26 at the both sides thereof is formed by pressing this forming die 200 against a first clad 12.

Figure 15C:
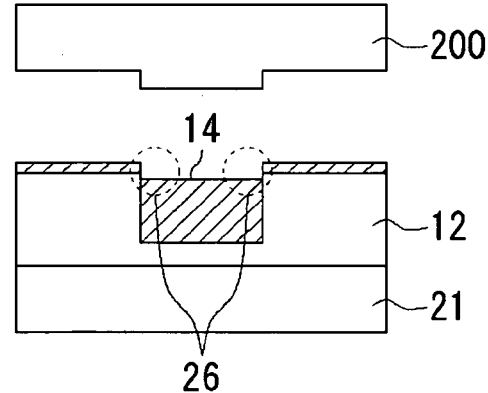

A forming die 200 shown in FIG. 15C is such that in a side to be in contact with a core 14 a rectangular-like projection is provided. By pressing this forming die 200 against a first clad 12, the top surface of the core 14 is pushed down below the top surface of a first clad 12, and the core 14 provided with narrowed portions 26 at the both sides thereof is formed.

Figure 15D:
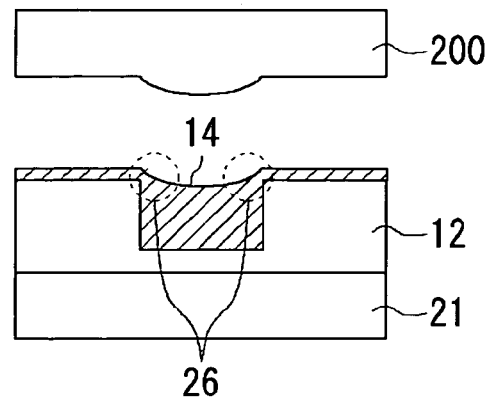

A forming die 200 shown in FIG. 15D is such that in a side to be in contact with a core 14 a projection where a portion near the center thereof is protuberant is provided. By pressing this forming die 200 against a first clad 12, a portion near the center of the core 14 is depressed, and the core 14 provided with narrowed portions 26 at the both sides thereof is provided.

The use of the forming dies as exemplified in FIGS. 15A through 15D can thus guarantee the convenient formation of narrowed portions 26 where the thickness of the core 14 and the residual core layer 15 is decreasing near the boundary between the core 14 and the residual core layer 15 even if the residual core layer 15 is present in the first clad 12.

Figure 16A:
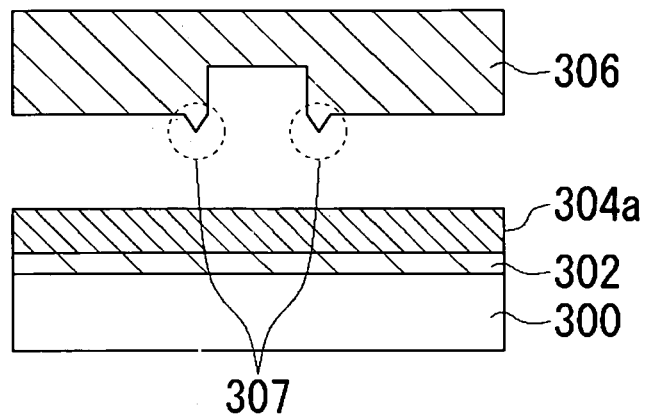
FIGS. 16A to 16D are process drawings showing still another example of fabrication procedure for an optical device.
Figure 16B:
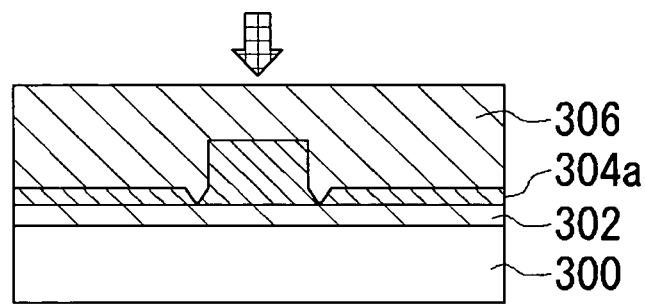
Figure 16C:
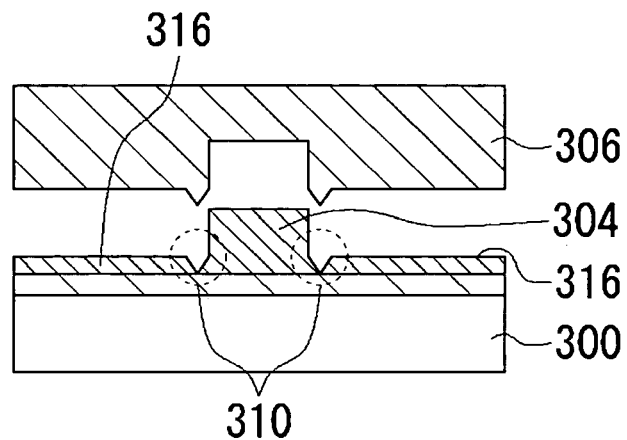
Figure 16D:
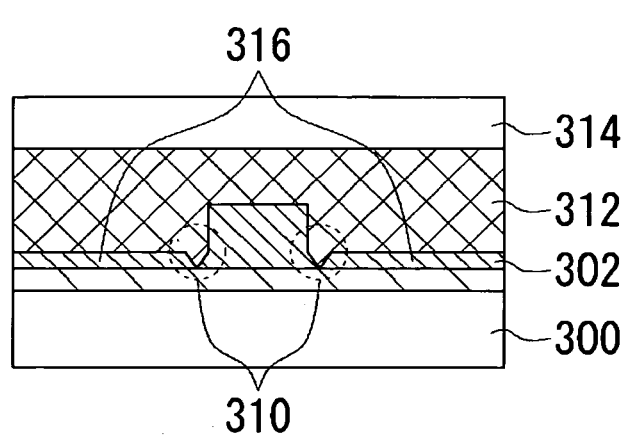

FIGS. 16A to 16D illustrate processes showing still another example of production procedure for an optical device 10, and they show production processes of an optical waveguide using a stamper. Referring to FIG. 16A, a first clad 302 is formed on a substrate 300, and a core solution layer 304a, which will form a core, is applied on the second clad 302. On the other hand, a recessed portion corresponding to the core 304 is provided in a stamper 306, and a pair of projections 307 is formed on the surface of the stamper 306 near both sides of the recessed portion. Then the stamper 306 is pressed against the core solution layer 304a, and in this state the core solution layer 304a is hardened by irradiating it with ultraviolet rays. Formed thereby is a core provided with a pair of narrowed portions 310 in both sides of sidewall bases as shown in FIG. 16C. Following that, first clad solution is dripped on the second clad 302 and the core 14, and the substrate 314 is placed thereon. In this state first second clad solution is hardened by irradiating it with ultraviolet rays so as to form a first clad 312 (FIG. 16D)

By taking such procedures as above, the optical loss is reduced and the facility and capacity of optical waveguides is improved even if a residual core layer 316 is formed between the second clad 302 and the stamper 306. This is because the narrowed portions 310 are provided in the contact area between the core 304 and the residual core layer 316 and thus the light leaked from the core 304 into the residual core layer 316 can be suppressed.

The present invention has been described based on the embodiments which are only exemplary. It is understood by those skilled in the art that there exist other various modifications to the combination of each component and process described above and that such modifications are encompassed by the scope of the present invention which is defined by the appended claims.

What is claimed is:

1. An optical device having a core and a clad formed around the core, the clad including:
   a first clad having a recess in a flat area; and
   a second clad formed on the first clad, and
   the core being formed so as to fill in the recess of the first clad and being structured such that, in a cross section substantially perpendicular to a light propagation direction, narrowed portions are formed to be narrower than the thickness of a residual core layer left on the flat area of the first clad, in the vicinity of the flat area.

2. An optical device according to claim 1, further including: a light absorbing area, provided on the same plane as the core, which absorbs light leaked from the core.

3. An optical device according to claim 2, wherein the light absorbing area is provided at both sides of the core along the light propagation direction in the core.

4. An optical device according to claim 2, wherein the second clad, formed on the first clad, is formed around the core and wherein the light absorbing area, formed on the first clad, is formed over an entire surface of the first clad other than an area in which the core and the second clad are provide.

5. An optical device according to claim 2, wherein the light absorbing area is formed of material whose refractive index is higher than that of material constituting the clad.

6. An optical device according to claim 2, wherein the light absorbing area is formed of the same material as that constituting the core.

7. An optical device according to claim 2, wherein the core has a bent portion or branched portions relative to an axis of incident light and wherein the light absorbing area is provided in the vicinity of the bent portion or branched portions.

8. An optical device according to claim 2, wherein one of the light absorbing area and the clad is made of material containing carbonyl group and the other thereof is made of material containing hydroxyl group.

9. An optical device according to claim 1, wherein the core is formed in such a manner as to fill in the recess of the first clad and is formed in a curved shape such that a top surface thereof is dented below the height of the flat area in the first clad.

10. A method for manufacturing an optical device, the method including:
   filling, by applying core solution on a clad where a first recess is formed on a flat area of a surface thereof, the first recess with the core solution;
   removing the core solution applied on the surface of the clad by pressing a forming die against the clad; and
   forming, in the first recess, a core, having narrowed portions formed to be narrower than the thickness of a residual core layer left on the flat area of the first clad, in the vicinity of the flat area, by hardening the core solution in a state where the forming die is being pressed against the clad.

11. A method according to claim 10, wherein the clad further includes a second recess, wherein said filling the first recess with the core solution further includes filling the second recess with the core solution, and wherein said forming core further includes forming a light absorbing area in the second recess.

12. A method for manufacturing an optical device, the method including:
   applying core solution on a surface of a clad;
   removing the core solution applied on a flat area by pressing a forming against the clad, the forming die being such that a first recess is formed in the flat area of a surface thereof and a pair of projections is formed in the vicinity of both sides of the first recess; and
   forming, in the first recess, a core, having narrowed portions formed to be narrower than the thickness of a residual core layer left on the flat area of the first clad, in the vicinity of the projections, by hardening the core solution in a state where the forming die is being pressed against the clad.

13. A method according to claim 12, wherein the forming die further includes a second recess and wherein said forming core further includes forming a light absorbing area in the second recess.

14. A method according to claim 10, wherein the forming die is made of elastic material whose durometer hardness A is less than or equal to 85.

15. A method according to claim 12, wherein the forming die is made of elastic material whose durometer hardness A is less than or equal to 85.

* * * * *